United States Patent
Ni et al.

(10) Patent No.: US 9,367,371 B2
(45) Date of Patent: Jun. 14, 2016

(54) WIDGET FRAMEWORK, REAL-TIME SERVICE ORCHESTRATION, AND REAL-TIME RESOURCE AGGREGATION

(75) Inventors: Bin Ni, Fremont, CA (US); Diego Lagunas, San Jose, CA (US); Jun Lu, Sunnyvale, CA (US); Venu Reddy, San Jose, CA (US); Ramamurthy Kumar, Cupertino, CA (US); Sami Ben Romdhane, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 214 days.

(21) Appl. No.: 12/754,564

(22) Filed: Apr. 5, 2010

(65) Prior Publication Data

US 2011/0197197 A1    Aug. 11, 2011

Related U.S. Application Data

(60) Provisional application No. 61/302,082, filed on Feb. 5, 2010.

(51) Int. Cl.
*G06F 9/54* (2006.01)
*G06F 9/50* (2006.01)
*G06F 9/455* (2006.01)
*G06F 9/445* (2006.01)
*H04L 29/08* (2006.01)

(52) U.S. Cl.
CPC ....... *G06F 9/547* (2013.01); *G06F 8/60* (2013.01); *H04L 67/04* (2013.01); *H04L 67/1002* (2013.01)

(58) Field of Classification Search
None
See application file for complete search history.

(56) References Cited

U.S. PATENT DOCUMENTS

| 5,325,524 A * | 6/1994 | Black et al. |
| 5,649,103 A | 7/1997 | Datta et al. |
| 6,321,274 B1 * | 11/2001 | Shakib et al. ................ 719/330 |
| 6,427,234 B1 * | 7/2002 | Chambers et al. ............ 717/140 |
| 7,110,525 B1 | 9/2006 | Heller et al. |
| 7,890,955 B2 * | 2/2011 | Paramasivam et al. ....... 719/313 |

(Continued)

FOREIGN PATENT DOCUMENTS

| EP | 1217516 A2 | 6/2002 |
| JP | 2000099332 A | 7/2000 |

(Continued)

OTHER PUBLICATIONS

"Ajax for Everyone", [Online]. Retrieved from the Internet. <URL: http://labs.adobe.com/technologies/spry/home.html, (2007), 4 pgs.

(Continued)

*Primary Examiner* — Umut Onat
(74) *Attorney, Agent, or Firm* — Schwegman Lundberg & Woessner, P.A.

(57) ABSTRACT

A method to optimize calls to a service by components of an application running on an application server is provided. The method includes receiving a first call and a second call, the first call made to a service by a first one of a plurality of components included in the application, and the second call made to the service by a second one of the plurality of components; selecting one of a plurality of optimizations, the plurality of optimizations including orchestrating the first call and the second call into a third call to the service; and, in response to the selecting of the orchestrating of the first call and the second call into the third call as the one of the plurality of optimizations, orchestrating the first call and the second call into the third call.

19 Claims, 17 Drawing Sheets

(56) References Cited

U.S. PATENT DOCUMENTS

| | | | |
|---|---|---|---|
| 8,285,813 B1* | 10/2012 | Colton et al. | 709/217 |
| 2004/0215746 A1 | 10/2004 | McCanne et al. | |
| 2005/0080930 A1 | 4/2005 | Joseph | |
| 2005/0177752 A1 | 8/2005 | Hollander et al. | |
| 2005/0204360 A1* | 9/2005 | Meleshchuk | 719/314 |
| 2005/0273792 A1* | 12/2005 | Inohara et al. | 719/330 |
| 2005/0273793 A1 | 12/2005 | Goto | |
| 2006/0209868 A1* | 9/2006 | Callaghan | 370/428 |
| 2006/0293911 A1* | 12/2006 | Wittmann et al. | 705/1 |
| 2007/0240041 A1* | 10/2007 | Pearson | 715/522 |
| 2007/0291776 A1 | 12/2007 | Kenrick et al. | |
| 2008/0228920 A1* | 9/2008 | Souders et al. | 709/226 |
| 2008/0313659 A1 | 12/2008 | Eide et al. | |
| 2009/0013310 A1* | 1/2009 | Arner et al. | 717/120 |
| 2009/0019047 A1* | 1/2009 | Anderson et al. | 707/8 |
| 2009/0049444 A1* | 2/2009 | Ottavi et al. | 718/101 |
| 2009/0073938 A1 | 3/2009 | Zhu et al. | |
| 2009/0210498 A1 | 8/2009 | Sze et al. | |
| 2009/0249282 A1 | 10/2009 | Meijer et al. | |
| 2009/0271474 A1 | 10/2009 | Fu et al. | |
| 2010/0077294 A1* | 3/2010 | Watson | 715/234 |
| 2010/0223322 A1* | 9/2010 | Mott et al. | 709/203 |
| 2011/0016449 A1* | 1/2011 | Yao et al. | 717/106 |

FOREIGN PATENT DOCUMENTS

| | | | |
|---|---|---|---|
| JP | 2006134206 A | 5/2006 | |
| JP | 2008511928 A | 4/2008 | |
| JP | 2009205264 A | 9/2009 | |
| JP | 2009290729 A | 12/2009 | |
| WO | WO-2009120440 A1 | 10/2009 | |
| WO | WO-2009120599 A2 | 10/2009 | |
| WO | WO-2011097078 A1 | 8/2011 | |

OTHER PUBLICATIONS

"D.O.H: Dojo Objective Harness", [Online]. Retrieved from the Internet. <URL. http://www.dojotoolkit.org/reference-guide/quickstart/doh.html#quickstart-doh, (2009), 7 pgs "Escenic Widget Framework", [Online]. Retrieved from the Internet: <URL: http://www.escenic.com/products/widgetframework/>, (2009), 4 pgs.

"International Application Serial No. PCT/US2011/022109 Search Report mailed Mar. 28, 2011", 3 pgs.

"International Application Serial No. PCT/US2011/022109 Written Opinion mailed Mar. 28, 2011", 8 pgs.

"Spry framework for Ajax", [Online]. Retrieved from the Internet. <URL. http://labs.adobe.com/technologies/spry/, (2010), 1 pg.

"Spry Widget Model", [Online]. Retrieved from the Internet. <URL. http://labs.adobe.com/technologies/spry/articles/spry_widget_model/index.html, (2006), 2 pgs.

"Using the Spry Framework", Adobe Systems Inc, (2006), 32 pgs.

"Dojo Build System", http://www.dojotoolkit.org/reference-guide/build/index.html#build-index, (Accessed Mar. 10, 2010), 6 pgs.

"dojo Documentation", [Online]. Retrieved from the Internet: <URL: http://www.dojotoolkit.org/reference-guide/quickstart/custom-builds.html#quickstart-custom-builds>, (Accessed Mar. 10, 2010), 4 pgs.

"Dojo Toolkit—Unbeatable JavaScript Tools", [Online]. Retrieved from the Internet. <URL. http://www.dojotoolkit.org/, (Accessed Mar. 10, 2010), 1 pg.

"Escenic Widget Framework", (Accessed Mar. 10, 2010), 2 pgs.

"International Application Serial No. PCT/US2011/022109, International Preliminary Report on Patentability mailed May 21, 2012", 15 pgs.

"jQuery", [Online]. Retrieved from the Internet. <URL. http://queryui.com/docs/Upgrade_Guide, (Accessed Mar. 10, 2010), 4 pgs.

"jQuery", [Online]. Retrieved from the Internet: <URL: http://jqueryui.com>, (Accessed Mar. 10, 2010), 1 pg.

"jQuery Demos and Documentation", [Online]. Retrieved from the Internet: <URL: http://jqueryui.com/demos/>, (Accessed Mar. 10, 2010), 1pg.

"jQuery UI API Developer Guide", http://queryui.com/docs/Developer_Guide, (Accessed Mar. 10, 2010), 3 pgs.

"Spry Documentation", [Online]. Retrieved from the Internet: <URL: http://labs.adobe.com/technology/spry/docs.html>, (Accessed Mar. 10, 2010), 1 pg.

"Spry Primer", [Online}. Retrieved from the Internet. <URL. http://labs.adobe.com/technologies/spry/articles/spry_primer/index.html, (Accessed Mar. 10, 2010), 3 pgs.

"What is jQuery UI?", [Online]. Retrieved from the Internet: <URL: http://jqueryui.com/docs/Getting_Started>, (Acessed Mar. 10, 2010), 3 pgs.

"Working with Spry XML Data Sets", [Online]. Retrieved from the Internet: <URL: http://labs.adobe.com/technologies/spry/articles/data_set_overview/index.html>, (Accessed Mar. 10, 2010), 28 pgs.

"Yahoo Widgets", [Online]. Retrieved from the Internet. <URL. http://widgets.yahoo.com/download/, (Accessed Mar. 10, 2010), 2 pgs.

"Australian Application Serial No. 2011213189, First Examiner Report mailed Jun. 28, 2013", 3 pgs.

"European Application Serial No. 11740184.4, Communication Pursuant to Rules 161(2) and 162 EPC mailed Sep. 21, 2012", 2 pgs.

"European Application Serial No. 11740184.4, Response filed Jan. 29, 2013 to Communication Pursuant to Rules 161(2) and 162 EPC mailed Sep. 21, 2012", 13 pgs.

"Japanese Application Serial No. 2012-551993, Office Action mailed Nov. 19, 2013", with English translation of claims, 6 pgs.

"Japanese Application Serial No. 2012-551993, Voluntary Amendment filed Sep. 27, 2012", with English translation of claims, 18 pgs.

"Australian Application Serial No. 2011213189, Response filed Jun. 25, 2014 to Examiners Report mailed Jun. 28, 2013", 28 pgs.

"Australian Application Serial No. 2011213189, Subsequent Examiners Report mailed Jul. 24, 2014", 5 pgs.

"Canadian Application Serial No. 2,788,899, Office Action mailed Mar. 27, 2014", 2 pgs.

"Japanese Application Serial No. 2012-551993, Response filed Feb. 17, 2014", with English translation of claims, 16 pgs.

"Japanese Application Serial No. 2014-137315, Voluntary Amendment filed Jul. 30, 2014", with English translation of claims, 8 pgs.

"Korean Application Serial No. 2012-7023102, Office Action mailed May 30, 2014", with English translation of claims, 7 pgs.

"Australian Application Serial No. 2011213189, Response filed Sep. 26, 2014", 25 pgs.

"Canadian Application Serial No. 2,788,899, Response filed Sep. 23, 2014", 16 pgs.

"Korean Application Serial No. 2012-7023102, Office Action mailed Feb. 24, 2015", with English translation of claims, 16 pgs.

"Korean Application Serial No. 2012-7023102, Response filed Sep. 30, 2014", with English translation of claims, 69 pgs.

"Korean Application Serial No. 2014-7027561, Office Action mailed Dec. 18, 2014", with English translation of claims, 8 pgs.

"Korean Application Serial No. 2014-7027561, Response filed Apr. 17, 2015", with English translation of claims.

Babu, Chitra, et al., "Method Driven Model: A Unified Model for an Object Composition Language", ACM SIGPLAN, vol. 39(8), [Online]. Retrieved from the Internet: <URL: http://www.academia.edu/4900602/Method_Driven_Model_A_Unified_Model_for_an_Object_Composition_Language>, (Aug. 2004), 61-71.

"Australian Application Serial No. 2015200369, Office Action mailed Nov. 13, 2015", 4 pgs.

"Canadian Application Serial No. 2,788,899, Response filed Dec. 22, 2015 to Office Action mailed Jun. 22, 2015", 21 pgs.

"Korean Application Serial No. 2012-7023102, Office Action mailed Oct. 30, 2015", with English translation of claims, 8 pgs.

"Korean Application Serial No. 2014-7027561, Office Action mailed Oct. 3, 2015", with English translation of claims, 10 pgs.

"Canadian Application Serial No. 2,788,899, Office Action mailed Jun. 22, 2015", 7 pgs.

(56) References Cited

OTHER PUBLICATIONS

"European Application Serial No. 11740184.4, Extended European Search Report mailed Jul. 29, 2015", 20 pgs.
"Japanese Application Serial No. 2014-137315, Decision to Grant mailed Aug. 11, 2015", with English translation, 6 pgs.
"Korean Application Serial No. 2012-7023102, Response filed May 22, 2015", with English translation of claims, 23 pgs.
Anthony, Allegri, et al., "Web service simulator framework solution using Spring", (Feb. 2, 2010).
Niels, Leenheer, "Make your pages load faster by combining and compressing javascript and css files", (Dec. 18, 2006).
European Application Serial No. 11740184.4, Response filed Feb. 23, 2016, 19 pgs.
Korean Application Serial No. 2014-7027561, Response filed 02-03-16 to Office Action mailed Oct. 3, 2015, (English Translation of Claims), 21 pgs.
Korean Application Serial No. 2015-7009935, Office Action mailed Apr. 19, 2016, W/ English Translation, 10 pgs.

\* cited by examiner

```
<xsd:complexType name="page-config">
    <xsd:sequence>
        <xsd:element name="page-type" maxOccurs="unbounded">
            <xsd:complexType>
                <xsd:sequence>
                    <xsd:element name="left" type="cmi:widget-type" minOccurs="1"/>
                    <xsd:element name="right" type="cmi:widget-type" minOccurs="0"/>
                    <xsd:element name="center" type="cmi:widget-type" minOccurs="0"/>
                </xsd:sequence>
                <xsd:attribute name="id" type="xsd:NMTOKEN" use="required"/>
            </xsd:complexType>
        </xsd:element>
    </xsd:sequence>
</xsd:complexType>

<xsd:complexType name="widget-type">
    <xsd:choice maxOccurs="unbounded">
        <xsd:element name="static-widget">
            <xsd:complexType>
                <xsd:attribute name="id" type="xsd:NMTOKEN" use="required"/>
                <xsd:attribute name="show" type="xsd:boolean" use="required"/>
            </xsd:complexType>
        </xsd:element>
        <xsd:element name="rtm-widget">
            <xsd:complexType>
                <xsd:attribute name="id" type="xsd:NMTOKEN" use="required"/>
                <xsd:attribute name="placementId" type="xsd:integer" use="required"/>
                <xsd:attribute name="width" type="xsd:integer" use="required"/>
                <xsd:attribute name="height" type="xsd:integer" use="required"/>
                <xsd:attribute name="show" type="xsd:boolean" use="required"/>
            </xsd:complexType>
        </xsd:element>
    </xsd:choice>
</xsd:complexType>
```

*FIG. 6*

```
@CodegenManagedData("com.ebay.meta")
public class Help { public static class PageConfig extends StructUnitDef {
        PageConfig() {
            addChildUnit(new Unit("pageType", PageType.class).setMultiplicity(UnitDef.Multiplicity.MAP));
        }
    } public static class PageType extends StructUnitDef {
        PageType() {
            addChildUnit(new Unit("left", Widget.class).setMultiplicity(UnitDef.Multiplicity.OPTIONAL_LIST));
            addChildUnit(new Unit("right", Widget.class).setMultiplicity(UnitDef.Multiplicity.OPTIONAL_LIST));
            addChildUnit(new Unit("center", Widget.class).setMultiplicity(UnitDef.Multiplicity.OPTIONAL_LIST));
        }
    } public static class Widget extends ChoiceUnitDef {
        Widget() {
            addOption(new Unit("staticWidget", StaticWidget.class));
            addOption(new Unit("rtmWidget", RtmWidget.class));
        }
    } public static class StaticWidget extends StructUnitDef {
        StaticWidget() {
            // there is actually no unit, just attributes
            addAttribute("staticWidgetId", StringDef.getInstance());
            addAttribute("show", StringDef.getInstance()); // TODO: make it a boolean
        }
    } public static class RtmWidget extends StructUnitDef {
        RtmWidget() {
            addAttribute("placementId", StringDef.getInstance()); // TODO: this should be adapted from com.ebay.globalenv.realtimemessaging.PlacementIdEnum
            addAttribute("width", StringDef.getInstance()); // TODO: make it an integer
            addAttribute("height", StringDef.getInstance()); // TODO: make it an integer
            addAttribute("show", StringDef.getInstance()); // TODO: make it a boolean
        }
    }
}
```

```
package com.ebay.meta;

import com.ebay.manageddata.IManagedValue;
import com.ebay.manageddata.ManagedList;
import com.ebay.manageddata.ManagedMap;

public interface IHelp { public interface IPageConfig {
        ManagedMap<IPageType> getPageType();
    } public interface IPageType {
        ManagedList<IWidget> getLeft();
        ManagedList<IWidget> getRight();
        ManagedList<IWidget> getCenter();
    } public interface IWidget {
        enum UnitName { staticWidget, rtmWidget }
        UnitName getUnitName();
        IManagedValue<IWidget> getOption();
    } public interface StaticWidget extends IWidget {
        IManagedValue<String> getStaticWidgetId();
        IManagedValue<String> getShow();
    } public interface RtmWidget extends IWidget {
        IManagedValue<String> getPlacementId();
        IManagedValue<String> getWidth();
        IManagedValue<String> getHeight();
        IManagedValue<String> getShow();
    }
}
```

```
<html>
<title>DSFClient Demo</title>
<body>
<div id="demo">click me</div>
</body>
</html>
```

```
public class TestClient extends BaseClientApp {
    public void onPageLoad(IDocumentCtx ctx) {
        if(ctx.getDocumentURL().endsWith("/demo.html")) {
            addDocumentEventListener(ctx, DomEventType.LEFTCLICK, new LeftClickListener());
        }
    } private class LeftClickListener implements IEventListener<DomEventType, IDomEvent> {
        public void handle(IDomEvent event) {
            HtmlElement div = event.getDocumentCtx().getDocument().getElementById("demo");
            div.setInnerHTML("Hello, world!");
        }
    }
}
```

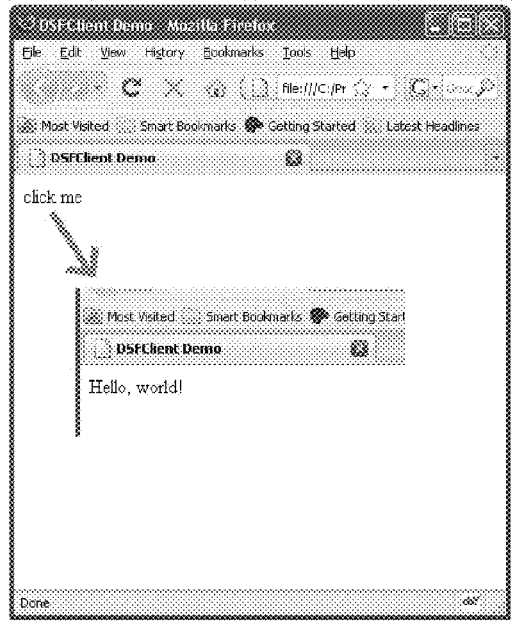

FIG. 12D

WIDGET FRAMEWORK, REAL-TIME SERVICE ORCHESTRATION, AND REAL-TIME RESOURCE AGGREGATION

RELATED APPLICATIONS

This application claims the priority benefit of U.S. Provisional Application No. 61/302,082, entitled "WIDGET FRAMEWORK, REAL-TIME SERVICE ORCHESTRATION, AND REAL-TIME RESOURCE AGGREGATION," filed Feb. 5, 2010, which is incorporated herein by reference.

TECHNICAL FIELD

The present application relates generally to the technical field of optimizing server performance, and, in one specific example, to optimizing an efficiency of calls to services by components of an application running on an application server.

BACKGROUND

To be competitive in a global market, a network-based marketplace that serves a large, world-wide community of users may find it beneficial to meet objectives of (1) rapidly developing, modifying, testing, or deploying a large number of server-side applications such that rapidly-changing needs of the users are met, (2) optimizing the server-side applications such that their deployment does not violate resource and performance constraints. In one approach, the network-based marketplace may achieve its objective by employing a large-sized group of developers to code each server-side application by hand; however, such an approach may have various drawbacks, including producing applications that have a less consistent look-and-feel, take a longer time to develop, or are less efficient in terms of, for example, reuse of code, than applications produced using other approaches. In another approach, the network-based marketplace may achieve its objectives by employing a small-sized group of developers to code applications that conform rigidly to a template; however, such an approach would also have various drawbacks, including producing applications that are more difficult to customize, consume more resources, or have slower performance than applications produced using other approaches.

Thus, there may be a need to develop each server-side application using a framework that supports the rapid developing, modifying, testing, or deploying of the large number of server-side applications using widgets. A widget may be a software component that has one or more user interfaces (UIs) and is backed by business logic (or services). That is, the widget may have a presentation layer that may be plugged in or configured to present one or more views and a logic layer that may be plugged in or configured to incorporate various data sources or services. The widget may also have a connection module that connects the presentation layer to the logic layer. The widget may also support optimizations, including real-time resource aggregation and real-time service orchestration. Real-time service orchestration may allow the widget to support run-time optimizations, including detecting and combining calls by multiple widgets to the same service. Real-time resource aggregation may allow the widget to aggregate at run-time all resources for a web page into a single resource for the web page (e.g., aggregate all versions or instances of a JavaScript or a cascading style sheet (CSS) into a single resource for the web page). The framework may also support design-time or real-time creation, modification, or deletion of the page (e.g., through a developer tool that supports dragging-and-dropping of the components).

BRIEF DESCRIPTION OF THE DRAWINGS

Some embodiments are illustrated by way of example and not limitation in the figures of the accompanying drawings in which:

FIG. 6 depicts an example schema corresponding to the schema diagram of FIG. 4;

FIG. 7 depicts example types (e.g., classes) that correspond to the example schema of FIG. 5;

FIG. 8 depicts an example API for configuring the component that is based on the example schema of FIG. 6 or the types of FIG. 7;

FIG. 12A is a source code listing of an example HTML page (e.g., demo.html) associated with the simulating module;

FIG. 12B is a source code listing of an example JAVA™ test client (e.g., TestClient.java);

FIG. 12C is a JAVA™ console log associated with a running of the example HTML page and the JAVA™ test client in a web browser;

FIG. 12D is an example user interface of the simulating module simulating a deployment of the example HTML page on the application server;

DETAILED DESCRIPTION

Figure 1A:
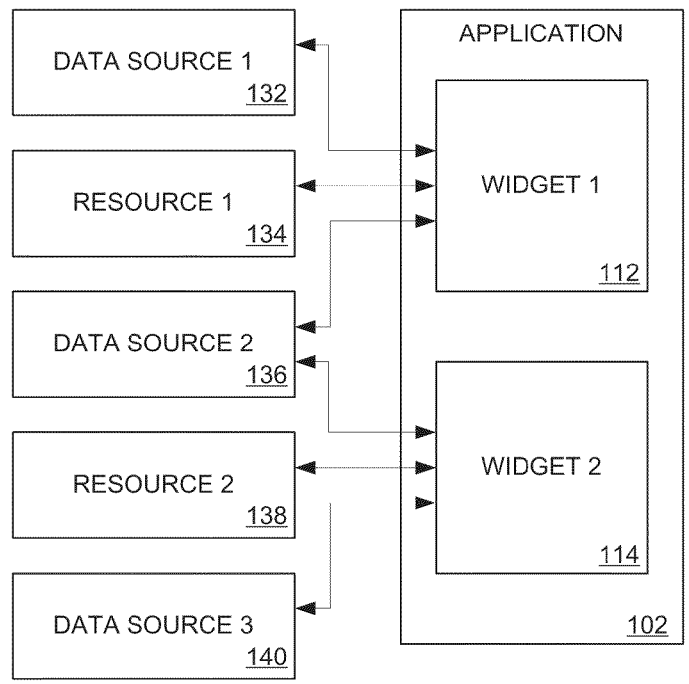
FIG. 1A is a block diagram illustrating example relationships between components of an application and data sources and resources.

In the following description, for purposes of explanation, numerous specific details are set forth in order to provide an understanding of various embodiments of the inventive subject matter. It will be evident, however, to those skilled in the art that embodiments may be practiced without these specific details. Further, well-known instruction instances, protocols, structures, and techniques have not been shown in detail. As used herein, the term "or" may be construed in an inclusive or exclusive sense.

The term "BizMo" includes a business module that may include user interface (UI) presentation, data/service access, including input, or configuration. The term "Action Input" includes input parameters for a Business Module to make an action. The term "BizOp" or "BizOperation" includes business operations a business module may delegate to an outside entity (e.g., a service call). A BizOp may be plugged in as a strategy into a business module. The term "BizMo View" includes the UI of a business module. The term "View Builder" includes a UI builder that can be plugged in as a strategy into a business module. The term "BizMoManager" includes a controller that drives a life cycle of a business module. The term "BizOpEngine" includes an engine that optimizes and executes business operations. The terms "BizMo," "widget," and "business module" may be used interchangeably. The term "user" includes a person or a machine. A component of an application may include a widget.

In an example embodiment, a system to optimize calls to a service by components of an application running on an application server is provided. The system includes a call optimizer in the application. The call optimizer includes an intercepting module to intercept a first call and a second call, the first call made to a service by a first one of the components and the second call made to the service by a second one of the components; and an orchestrating module to orchestrate the first call and the second call into a third call.

In another example embodiment, a system to optimize calls to the service by components of the application running on the application server is provided. The system includes a call optimizer associated with the application. The call optimizer includes the intercepting module to intercept the first call and the second call; an optimization-selecting module to select one of multiple optimizations, the multiple optimizations including orchestrating the first call and the second call into the third call; and the orchestrating module to, in response to the selecting of the orchestrating of the first call and the second call into the third call as the one of the multiple optimizations, orchestrate the first call and the second call into the third call.

In another example embodiment, a method to optimize the calls to the service by the components of the application running on the application server is provided. The method includes receiving the first call and the second call, the first call made to the service by a first one of the components, and the second call made to the service by the second one of the components; selecting one of multiple optimizations, the multiple optimizations including orchestrating the first call and the second call into the third call to the service; and, in response to the selecting of the orchestrating of the first call and the second call into the third call as the one of the multiple optimizations, orchestrating the first call and the second call into the third call.

In another example embodiment, a machine-readable storage medium comprising instructions that, when executed by one or more processors of a machine, causes the machine to perform a method to optimize the calls to the service by the components of the application running on the application server is provided. The method includes receiving the first call and the second call, selecting one of multiple optimizations, the multiple optimizations including orchestrating the first call and the second call into the third call to the service; and, in response to the selecting of the orchestrating of the first call and the second call into the third call as the one of the multiple optimizations, orchestrating the first call and the second call into the third call.

FIG. 1A is a block diagram illustrating example relationships 100 between components of an application and data sources and resources. The components of the application may include a widget 1 112 and a widget 2 114. The data sources may include a data source 1 132, a data source 2 136, or a data source 3 140. The resources include a resource 1 134 and a resource 2 138. FIG. 1A depicts the widget 1 112 as having relationships with the data source 1 132, the resource 1 134, and the data source 2 136. FIG. 1A also depicts the widget 2 114 as having relationships with the data source 2 136, the resource 2 138, and the data source 3 140.

The relationship between the widget 1 112 and the data source 2 136 may be that the widget 1 112 calls a service of the data source 1 132. Similarly, the relationship between the widget 2 114 and the data source 2 136 may be that the widget 2 114 also calls the service of the data source 2 136. The relationship between the widget 1 112 and the resource 1 134 may be that another component (not shown) of the application 102 upon which the widget 1 112 may be included uses the resource 1 134. For example, the widget 1 112 may be included in a document written in a markup language (e.g., HTML, XHTML, XML, SVG, or XUL), and the document may, in turn, be included in the application 102.

The resource 1 134 may be a resource that describes a presentation (e.g., the look and formatting) of the document in a style sheet language (e.g., the resource may be a CSS as defined by the World Wide Web Consortium (W3C) or a JavaScript Style Sheet (JSSS)). In this case, the widget 1 112 may use the resource 1 134 to determine the presentation of the document. The resource 1 134 may also be a JavaScript resource, an HTML resource, an ESF resource, a content resource (e.g., text, images, and so on), a prototype resource, a rule resource, a metadata resource, a metamodel resource, or another type of resource. Similarly, the relationship between the widget 2 114 and the resource 2 138 may be that another component (not shown) of the application 102 upon which the widget 2 114 may be included uses the resource 2 138.

Each of the data sources may be a web service. Furthermore, each of the data sources or resources may be located locally (e.g., on a same server, a same system, or a same network) or remotely (e.g., on a different server, a different system, or a different network) with respect to the application 102.

Figure 1B:
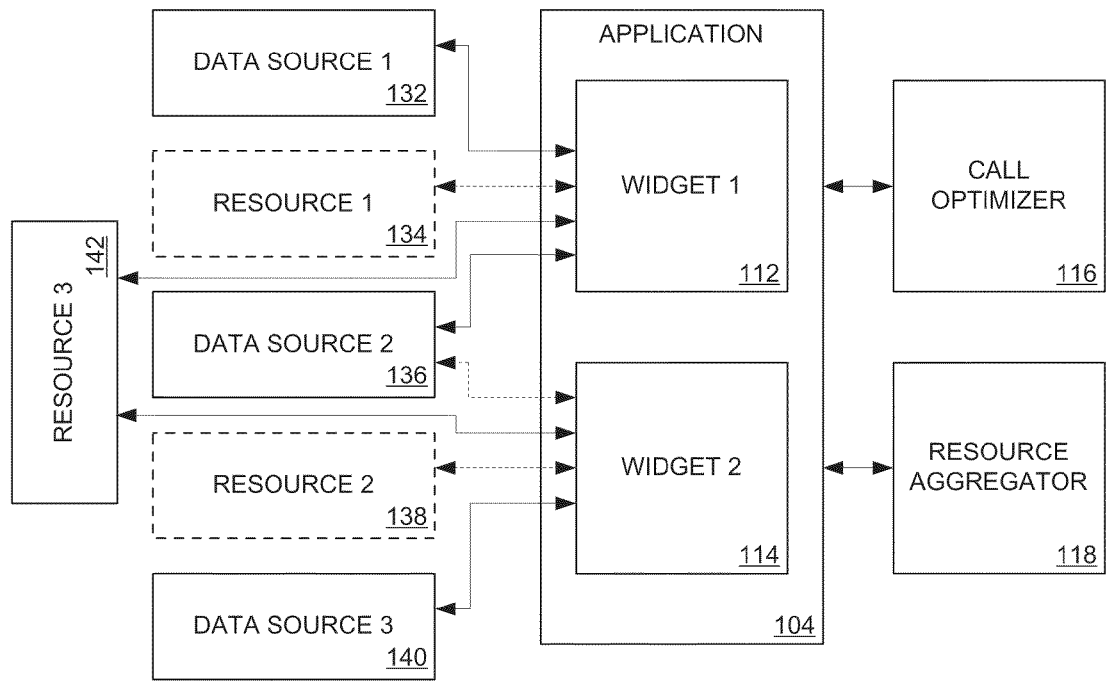
FIG. 1B is a block diagram illustrating example relationships between the components of the application and the data sources and the resources after a call optimizer and a resource aggregator have been incorporated into the application of FIG. 1A.

FIG. 1B is a block diagram illustrating example relationships 150 between the components of the application 104 and the data sources and the resources after a call optimizer 116 and a resource aggregator 118 have been associated with the application 104. In this example, an incorporation of the call optimizer 116 into the application 104 has eliminated a need for widget 2 114 to maintain a relationship with data source 2 136. Furthermore, an incorporation of the resource aggregator 118 has eliminated a need for widget 1 112 to maintain a relationship with resource 1 134 and for widget 2 114 to maintain a relationship with resource 2 138.

Furthermore, the incorporation of the resource aggregator 118 has resulted in an addition of a resource 3 142, an establishment of a relationship between the widget 1 112 and the resource 3 142, and an establishment of a relationship between the widget 2 114 and the resource 3 142. Resource 3 142 may include an aggregation of elements of resource 1 134 and resource 2 138 that application 104 uses. Resource 3 142 may not include elements of resource 1 134 or resource 2 138 that are redundant with each other. Thus, the incorporation of the call optimizer 116 into the application 104 may cause a number of service calls upon which application 104 relies to be reduced, and the incorporation of the resource aggregator 118 into the application 104 may cause a number of resources upon which the application 104 relies to be reduced. This optimization of service calls and aggregation of resources may improve the efficiency or performance of the application 104.

Figure 2A:
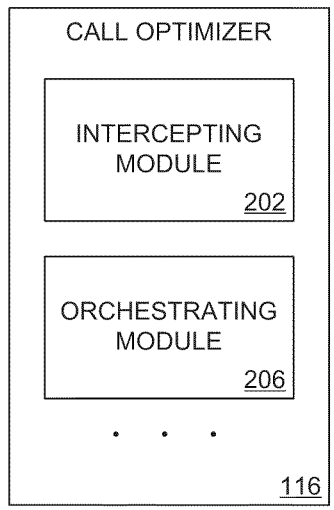
FIG. 2A is a block diagram illustrating modules of an example embodiment of the call optimizer of FIG. 1B.

FIG. 2A is a block diagram illustrating modules of an example embodiment of the call optimizer 116 of FIG. 1B. The call optimizer 116 may include an intercepting module 202 to intercept or receive calls (e.g., a first call and a second call) from components (e.g., widget 1 112 or widget 2 114) of an application (e.g., application 102) or an orchestrating module 206 to applying an orchestrating of the calls.

The applying of the orchestrating of the calls may include integrating a plurality of request parameters of the first call into a plurality of request parameters of a third call, integrating a plurality of request parameters of the second call into the plurality of request parameters of the third call, making the third call, receiving a result of the third call, identifying a first part of the result as corresponding to the first call, identifying a second part of the result as corresponding to the second call, providing the first part of the result to the first one of the plurality of components as a response to the first call, or providing the second part of the result to the second one of the plurality of components as a response to the second call. Other ones of the multiple techniques of optimizing the calls are described below with reference to FIG. 2B.

Figure 2B:
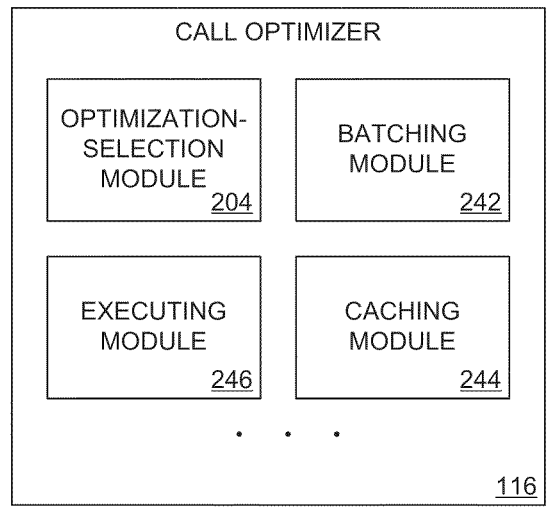
FIG. 2B is a block diagram illustrating additional modules of an example embodiment of the call optimizer of FIG. 1B.

FIG. 2B is a block diagram illustrating additional modules of an example embodiment of the call optimizer 116 of FIG. 1B. The call optimizer 116 may include an optimization-selection module 204, a batching module 242, a caching module 244, or an executing module 246. The optimization-selection module 204 may select one technique of optimizing the calls from multiple techniques of optimizing the calls. The multiple techniques of optimizing the calls may include providing a response to the first call or the second call from a cache, orchestrating the first call and the second call into a third call, making a batch call, executing the first call and the second call in parallel, and so on. The selecting of the one technique of optimizing the calls may be based on various criteria, including an amount of time the one technique may take to process the calls relative to the amount of time other ones of the multiple techniques may take to process the calls, a determination on an availability of the one technique or a lack of an availability of other ones of the multiple techniques, or another measure of a suitability of the one technique relative to other ones of the multiple techniques. In this case, the orchestrating module 206 may apply the orchestrating in response to a selecting of the orchestrating as the one technique.

The batching module 242 may, in response to a selection of the making of the batch call as the one technique of optimizing the calls, make a batch call instead of the first call or the second call. The batch call may be offered as a service of a data source to which the first call and the second call were directed. Thus, the selection of the making of the batch call may be based on the availability of the batching service at the data source. Furthermore, the selection of the making of the batch call may be based on a determination that a first part of a result of the batch call is usable as a response to the first call and a second part of the result of the batch call is usable as a response to the second call.

The caching module 244 may, in response to a selection of the providing the response to the first call or the second call from the cache as the one technique of optimizing the calls, provide a response to the first call or the second call using data contained in a cache in a memory instead of providing a response received from a making of the first call or the second call, respectively. The data contained in the cache in the memory may be a response received from a making of a third call to the service. Furthermore, the selection of the providing the response to the first call or the second call from the cache as the one technique may be based on a determination that the third call is substantially identical to the first call or the second call, or that the making of the first call or the second call is otherwise redundant with the making of the third call.

The executing module 246 may generally handle the execution of the calls. The executing module 246 may, in response to a selection of the executing the first call and the second call in parallel as the one technique, execute the first call and the second call in parallel. The selection of the executing of the first call and the second call in parallel may be based on a determination that the first call is not dependent on the second call or the second call is not dependent on the first call. The executing module 246 may handle a forwarding of a response to a call to an appropriate component (e.g., widget 1 112 of FIG. 1B) of the application. The executing module 246 may also handle an assembly of the response to the call from a result of an optimization (e.g., the making of a batch call, the providing result of the first call or the second call from the cache, or the orchestrating of the first call and the second call).

For simplicity, the above discussion refers to applying a single optimization technique with respect to a first call and a second call. However, it should be understood that call optimizer 116 may intercept one or more calls made by one or more application components, select one or more call optimizations with respect to the one or more calls, and apply the one or more call optimizations to the one or more calls. For example, call optimizer 116 may process any number of calls or apply any number of optimization techniques to the any number of calls. Additionally, the call optimizer 116 may perform operations in parallel or in serial. Moreover, the call optimizer 116 may perform operations automatically at run time. Nevertheless, an effect of the performance of the operations may be to make a component (e.g., a web page) of an application (e.g., application 102) perform as if it was optimized by manual or hand-coding by an application developer at design time. Furthermore, the call optimizer 116 may apply one or more optimizations to one or more calls from one of the one or more application components. In other words, the call optimizer 116 is not limited to applying the one or more optimizations to one or more calls from more than one component.

Figure 2C:
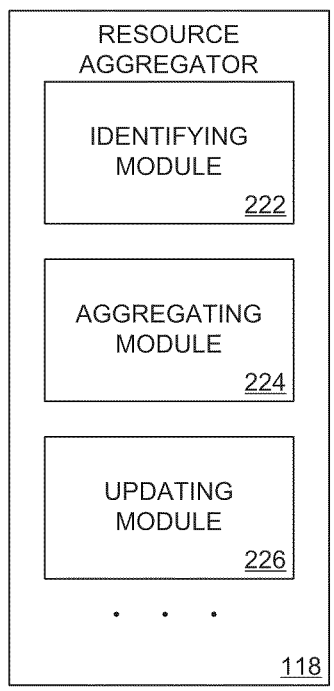
FIG. 2C is a block diagram illustrating modules of an example embodiment of the resource aggregator of FIG. 1B.

FIG. 2C is a block diagram illustrating modules of an example embodiment of the resource aggregator 118 of FIG. 1B. The resource aggregator 118 may include an identifying module 222, an aggregating module 224, or an updating module 226. The identifying module 222 may identify that at least a portion of a first resource of multiple resources associated with an application (e.g., application 102) is redundant with at least a portion of a second resource of the multiple resources. For example, the identifying module 222 may identify that the first resource is an updated version of the second resource or that the application can use at least a portion of the first resource instead of the second resource.

The aggregating module 224 may, in response to the identifying that at least the portion of the first resource is redundant with at least the portion of the second resource, aggregate the first resource and the second resource into a third resource. The third resource may include portions of the first resource and portions of the second resource that the application uses.

The updating module 226 may update the application to use the third resource. The updating of the application may remove a dependency of the application on the redundant portion of the first resource or the redundant portion of the second resource. For example, the updating module 226 may update the application to include in the third resource a portion of the first resource instead of the redundant portion of the second resource. Thus, the updating module 226 may reduce an overall size of resources upon which the application depends. Furthermore, the updating module 226 may externalize the third resource such that a client may cache the third resource instead of the first resource or the second resource. For example, the client may download and cache the third resource upon accessing the application for a first time. Then, upon accessing the application for a second time, the client need not download the third resource again. The resource aggregator 118 may perform resource aggregation automatically at run time. Nevertheless, an effect of the resource aggregation may be to make a component (e.g., a web page) of an application (e.g., application 102) appear as if it was optimized by manual or hand-coding by an application developer at design time.

Figure 2D:
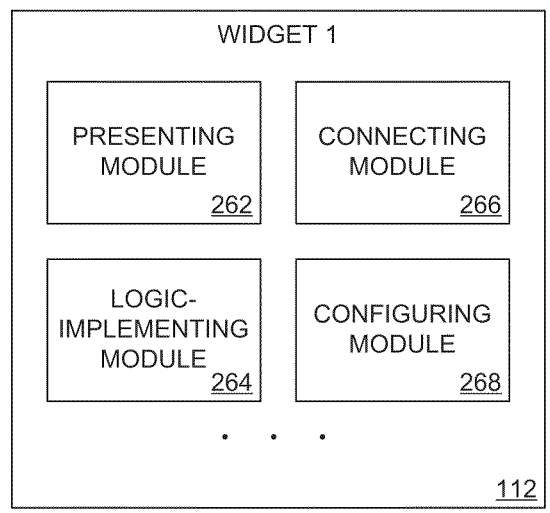
FIG. 2D is a block diagram illustrating example modules of the widget 1 of FIG. 1A and FIG. 1B.

FIG. 2D is a block diagram illustrating example modules of the widget 1 112 of FIG. 1A and FIG. 1B. The widget 1 112 may be a basic component (e.g., a header unit, a search unit, a category navigation unit, an authorization or authentication unit, or a member badge unit) of a more complex component (e.g., a web page) of an application. The widget 1 112 may include a presenting module 262, a logic-implementing module 264, a connecting module 266, or a configuring module 268. The presenting module 262 may present one or more UIs associated with widget 1 112. For example, if a client accessing the widget 1 112 is a mobile-device-based web browser (e.g., an Apple Safari browser), the presenting module 262 may present a UI that is adapted to the mobile-device-based web browser (e.g., a UI that includes less text or less images than a UI for a personal-computer based web browser). If the client accessing the widget 1 112 is a personal-computer-based web browser (e.g., a MICROSOFT® Windows INTERNET EXPLORER® browser), the widget may present a UI that is adapted to the personal-computer-based web browser (e.g., a UI that includes more images or more text than a UI for a mobile-device based web browser). The presenting module 262 may decouple a presenting of a user interface of the widget 1 112 from an implementing of the logic of the widget 1 112.

The logic-implementing module 264 may implement the logic of the widget 1 112. The implementing of the logic may include accessing one or more data sources (e.g., data source 1 132 or data source 2 136, both of FIG. 1B). Furthermore, the accessing of the one or more data sources may include calling one or more application programming interfaces (APIs) associated with the one or more data sources. The logic-implementing module 264 may decouple the implementing of the logic of the widget 1 112 from the presenting of the user interface of the widget 1 112.

The connecting module 266 may connect the presenting module 262 to the logic-implementing module 264 such that the presenting module 262 can integrate into the one or more UIs a presentation of data received from the logic-implementing module 264, including data that the logic-implementing module 264 receives through the accessing of the one or more data sources.

The configuring module 268 may expose configurable attributes of the widget 1 112 through a configuration API. The configuration API may give programmatic access to configuration data associated with the widget 1 112 (e.g., a data schema). The configuration API may allow the widget 1 112 to be configured through a simple user interface (e.g., a user interface of a tool that accesses the widget 1 112 through the configuration API) instead of requiring the widget 1 112 to be configured manually (e.g., through hand-coding of an XSD schema associated with an XML file). The configuration API may include functions to define or apply a theme (e.g., a Christmas or Halloween theme) to the widget 1 112. The applying of the theme may include a modifying of multiple ones of the configurable attributes of the widget 1 112 in a single operation. If the widget 1 112 is a search widget, the configuration API may expose a default search string as a configurable attribute of the widget 1 112. The configuration API may then be invoked to set the default search string (e.g., to "waterproof boots," "MP3 players," or another string). The configuration API may include functions to define or apply a localization of the widget 1 112. The applying of the localization may result in a changing of the text or images associated with the widget 1 112 based on a locality (language, region, and so on) of a user accessing the widget 1 112. For example, applying a German (e.g., de-DE) localization to the widget 1 112 may cause text associated with the widget 1 112 to be in the German language, whereas applying an English as used in the United States (e.g., en-US) localization to the widget 1 112 may cause the text associated with the widget 1 112 to be in the English language.

The configuring module 268 may also manage an association of the widget 1 112 with a metamodel. For example, the configuring module 268 may use a metadata definition framework (also called a metamodel framework, metadata framework, or metamodel definition framework). The metamodel framework may include an API (e.g., an IDataDef API) to manage descriptions of models (or types), such as types that may be used to describe the configurable attributes of the widget 1 112. The metamodel definition framework may support a structural or functional definition of a type (e.g., equivalent to an XML schema), be object-oriented with single type inheritance or polymorphism support, or prototype-oriented with data inheritance or layering (e.g., similar to JavaScript). Each basic type may have members including supertypes (single-inheritance types), constraints (type-invariant clauses (e.g., enumerations)), actions (delegate methods with any return type), transformations (delegate methods that can convert into other types (e.g., methods supporting polymorphism)), or initial or default data (e.g., with data inheritance or layering support). Each complex type may include members of the basic type or additional members, including associations (a role, a type, or a multiplicity), or attributes (simple name or value pairs). A role may be the name of an instance of an association. The multiplicity may be a single multiplicity (0, 0 . . . 1, 1), a list multiplicity (0 . . . n, 1 . . . n), or a map multiplicity (with strings or enumerations as keys).

The metadata framework may support a defining of types using a domain-specific language (DST). The DSL may use a prototype based approach in which model (or data) definitions (e.g., a IDataDef interface) are correlated with model (or data) instances (e.g., an IManagedData interface). The IDataDef interface may be at the top of the DSL definition hierarchy. The IDataDef interface may manage a lifecycle of the definition, including a structural definition or a data layering. The IDataDef interface may hold a type hierarchy or definitions of constraints, actions, or transformations. The DSL hierarchy may include a simple-value-unit-definition interface (e.g., an ISimpleValueUnitDef interface) that manages a conversion of an object from one type to another type (e.g., a conversion of JAVA™ objects to or from strings). The DSL definition hierarchy may include a complex-data-definition interface (e.g., an IComplexDataDef interface) that holds definitions of attributes or associations. The complex-data-definition interface may also include implementations to manage multiple semantics corresponding to the associations. For example, the complex-data-definition interface may include bean-like structures (e.g., StructDataDef objects) that become classes through a code-generation process or interface-like choices or alternatives (e.g., ChoiceDataDef objects) that become interfaces or enumerations through the code generation process.

Figure 3:
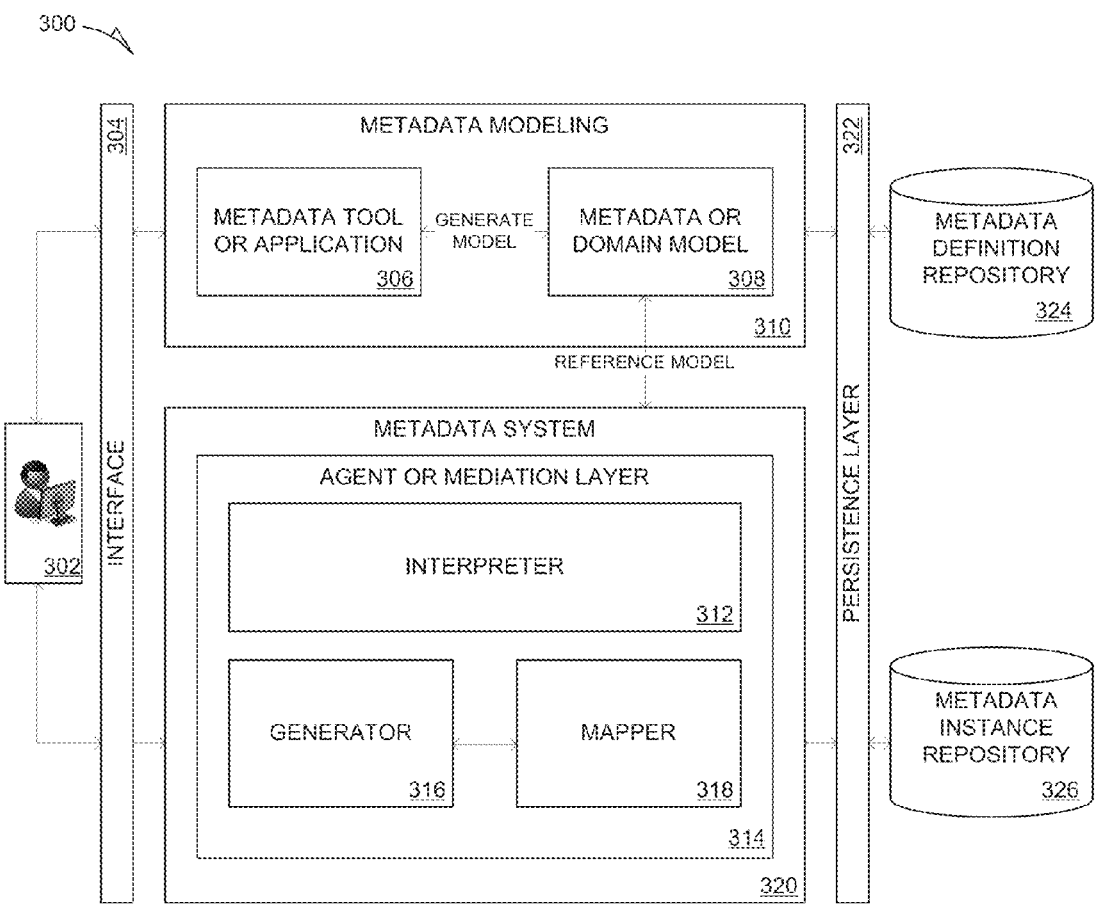
FIG. 3 is a block diagram of an example architecture of the metamodel framework.

FIG. 3 is a block diagram of an example architecture 300 of the metamodel framework. The metamodel framework may include a user 302. The user 302 may interact with a metadata modeling 310 component of the framework to model metadata (e.g., create type definitions, generate APIs, and so on) via interface 304. The metadata modeling 310 component may include a metadata tool or application 306 that provides a user interface to model metadata. The tool may create metadata or a domain model 308. The modeled metadata may become an input or be otherwise associated with a metadata system 320. The metadata system 320 may include an agent or mediation layer 314. The agent or mediation layer 314 may include an interpreter 312, a generator 316, or a mapper 318. The interpreter 312 may access a metadata definition or validate a type, a domain, or a range. The generator 316 may map an associated concrete class with the metadata definition or construct or wire-up a concrete object. The mapper 318 may map metadata classes to concrete classes. The metadata modeling 310 component may interact with a persistence layer 322 to store or access the metadata or a model. The persistence layer 322 may, in turn, interact with a metadata definition repository 324 to store the metadata definitions (e.g., type definitions), the model, or other metadata. The metadata system 320 may also interact with the persistence layer 322. The persistence layer 322 may, in turn, also interact with a metadata instance repository 326 to store instances of metadata (e.g., instances of type definitions).

The metamodel framework may support a prototype-based paradigm rather than a class-based inheritance paradigm. For example, a first web page with a header, content, or footer may be a prototype for a second web page with a more detailed header. The second web page may, in turn, be a prototype for a third web page with the more detailed header and a left-side navigation pane. A sub-classed prototype may add constraints, such as prototype invariants (e.g., validation rules) or value restrictions (e.g., enumerated strings or minimum or maximum values). The sub-classed prototype may not remove anything (but may change multiplicity to 0). The sub-classed prototype may add or mix in new attributes or structural elements (e.g., a mix-in may add namespace support to avoid name collisions). The sub-classed prototype may weave in behavior in the form of actions (e.g., arbitrary code to read or write a model) or transformations (e.g., code to convert or polymorph data from one type to another).

Figure 4A:
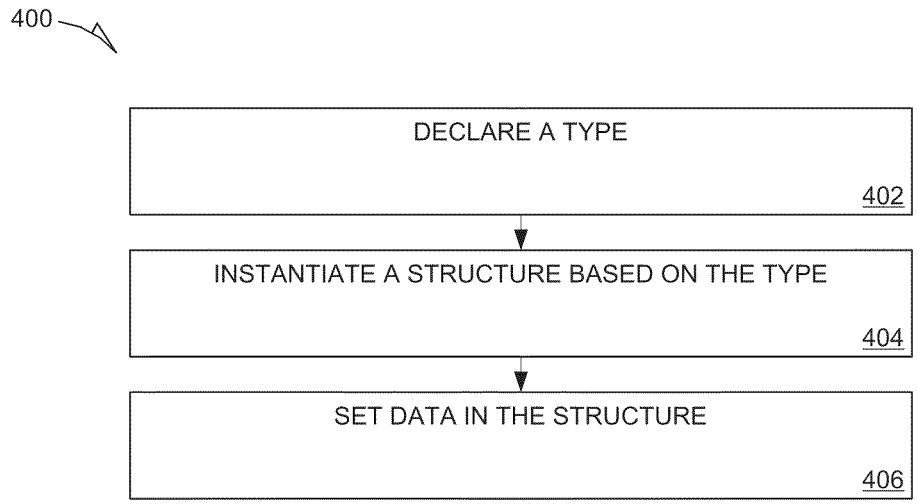
FIG. 4A is a flowchart of an example embodiment of a method of managing a lifecycle of a model definition.

The metamodel framework may support a model (or metadata) definition lifecycle. That is, the metamodel may (e.g., using the prototype-based approach) support model definitions that combine a structure definition and a data setting operation. The data setting may include setting values associated with an instance of an object of a type based on the structure definition. Such an object may be referred to as managed data. FIG. 4A is a flowchart of an example embodiment of a method 400 of managing a lifecycle of a model definition. The method 400 may include declaring 402 a type (e.g., creating a type definition that includes a reference to a type), instantiating 404 an object or structure based on the type (e.g., instantiating the type), or setting 406 data in the structure (e.g., setting a value associated with the instantiate type).

Figure 4B:
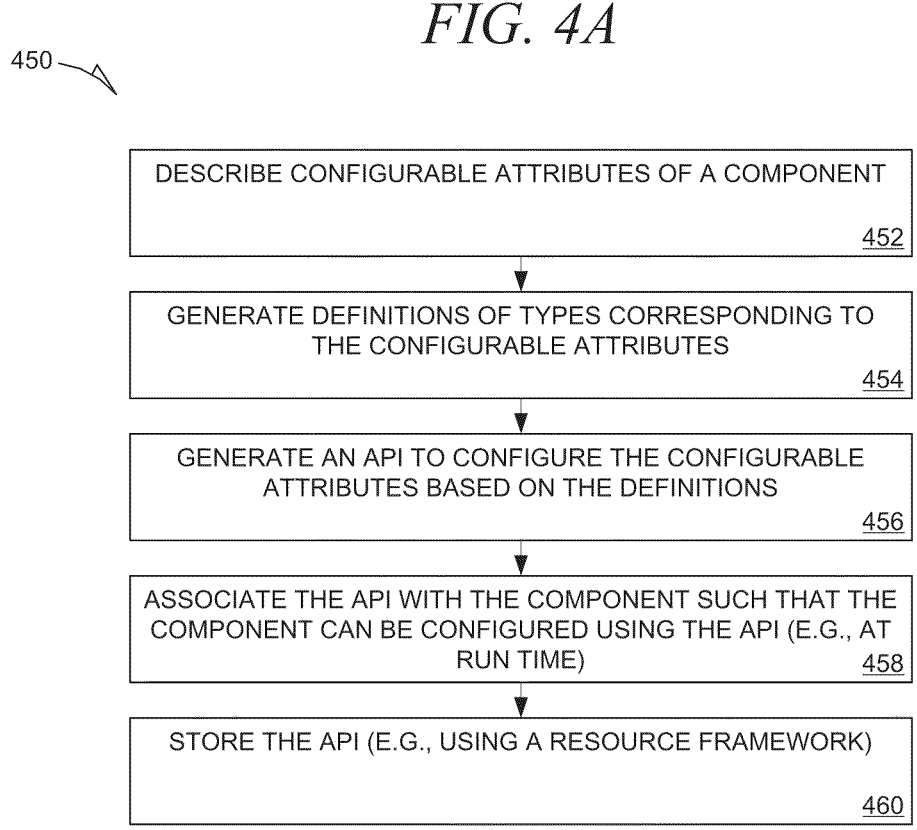
FIG. 4B is a flowchart of an example method of generating an API to configure a component (e.g., a Help page) of an application.

FIG. 4B is a flowchart of an example method 450 of generating an API to configure a component (e.g., a Help page) of an application. The method 450 may include determining 452 configurable attributes of a component (e.g., representing the configurable attributes or how the configurable attributes relate to each other using a schema diagram (e.g., via Unified Modeling Language (UML)) or a schema (e.g., via DSL)), creating or generating 454 type definitions from the schema, creating or generating 456 an API for configuring the component from the schema or type definitions, associating 458 the API with the component such the component can be configured using the API (e.g., at run time), or storing 460 the schema diagram, the schema, the type definitions, the API, or other metadata (e.g., using a resource framework). The configuring of the component may include using a client, such as a development tool, that exposes the API via a user interface or otherwise enables (or provides a front end to) the user to access the API.

Figure 5:
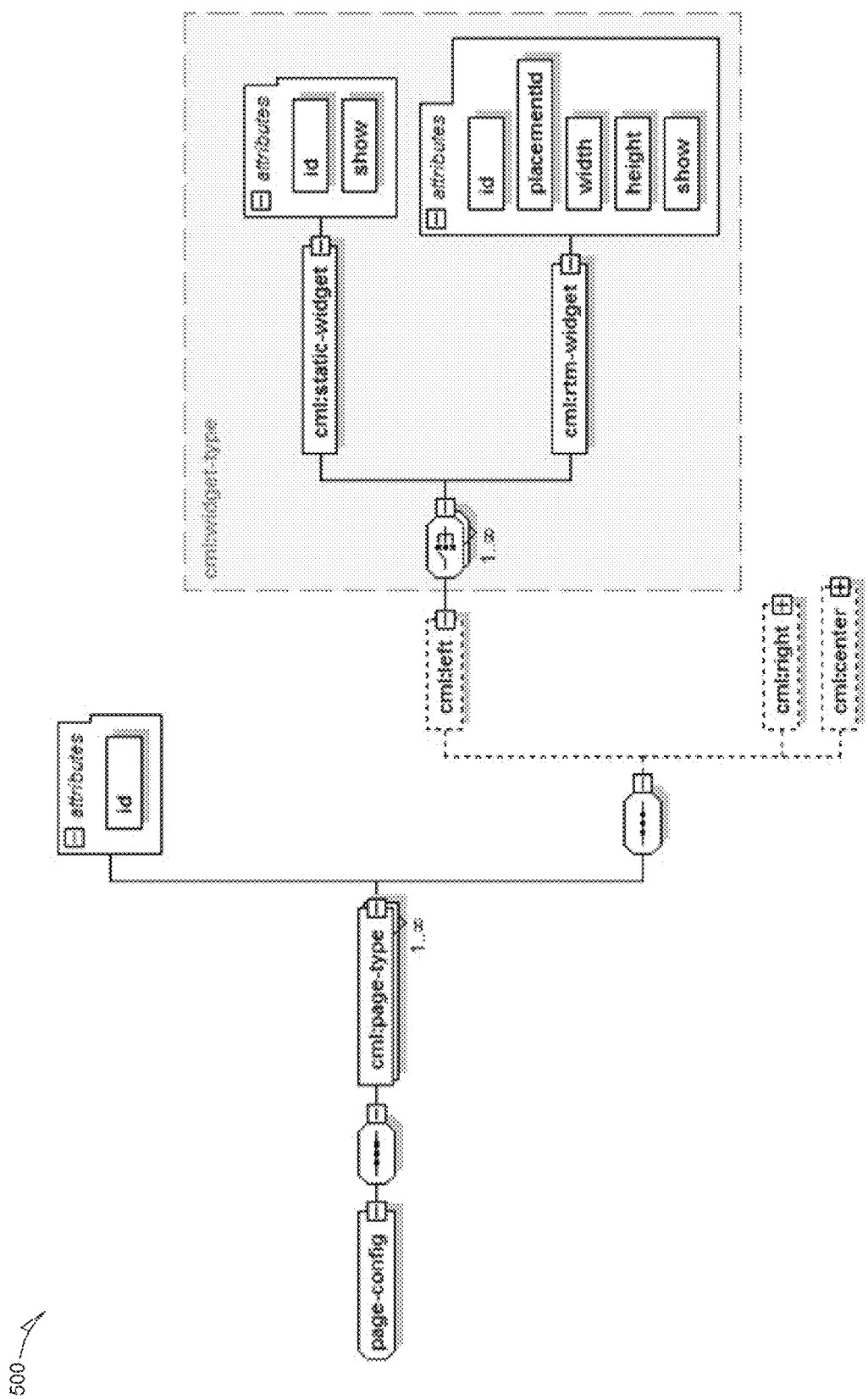
FIG. 5 depicts an example schema diagram of the configuration of the component of FIG. 4B.

FIG. 5, FIG. 6, FIG. 7, and FIG. 8 provide example snapshots of source code associated with the method 450 (FIG. 4B) for generating the API for configuring the component of the application. FIG. 5 depicts an example schema diagram 500 of the configuration of the component. FIG. 6 depicts an example schema 600 corresponding to the schema diagram of FIG. 5. FIG. 7 depicts example types (e.g., classes) 700 that correspond to the example schema 600 of FIG. 6. FIG. 8 depicts an example API 800 for configuring the component that is based on the example schema 600 or the example types 700.

The metamodel framework may include a model definition factory. The model definition factory may be used to get an instance of a definition or prototype. The model definition factory may support a single factory or reference model for new types and adapted (e.g., legacy) types. The model definition factory may be used by code generators (e.g., to generate 454 the type definitions or to generate 456 the API). The model definition factory may be used by tools (e.g., editors or metamodel-driven tools). The model definition factory may manage the metadata definition lifecycle. The model definition factory may support recursive types or layering of data. The model definition may support a registering of framework- or container-provided or application-specific metadata definition injectors. The framework-provided, container-provided, or application-specific metadata definition injectors may be implemented via a callback mechanism.

Thus, the example architecture 300 of the metamodel framework may provide a JAVA™-based model definition that enables type-safe plain-old JAVA™ object (POJO) model generation with key-value-coding (KVC) support, a generation Lit an XML marshaller or unmarshaller, a providing of run-time JAVA™ APIs for querying definitions for tooling, XSD or XMI (UML) generation for documentation or tooling purposes. The benefits of the metamodel framework may include a consistent interface for both definition and data consumption, reuse of definitions across different parties or legacy systems, tooling support (discoverability or definitions or tooling helpers), prototype-based definitions that allow mix-type definitions or value settings throughout the inheritance process, separation of concerns via mixins of multiple definitions or AOP definition injectors, separation of concerns via behavior weaving (e.g., transformers or type-safe accessors for references), or definition versioning to support a specification of a "compatibility key" (to be stored in each resource) or provide version converters to migrate incompatible versions.

Figure 9:
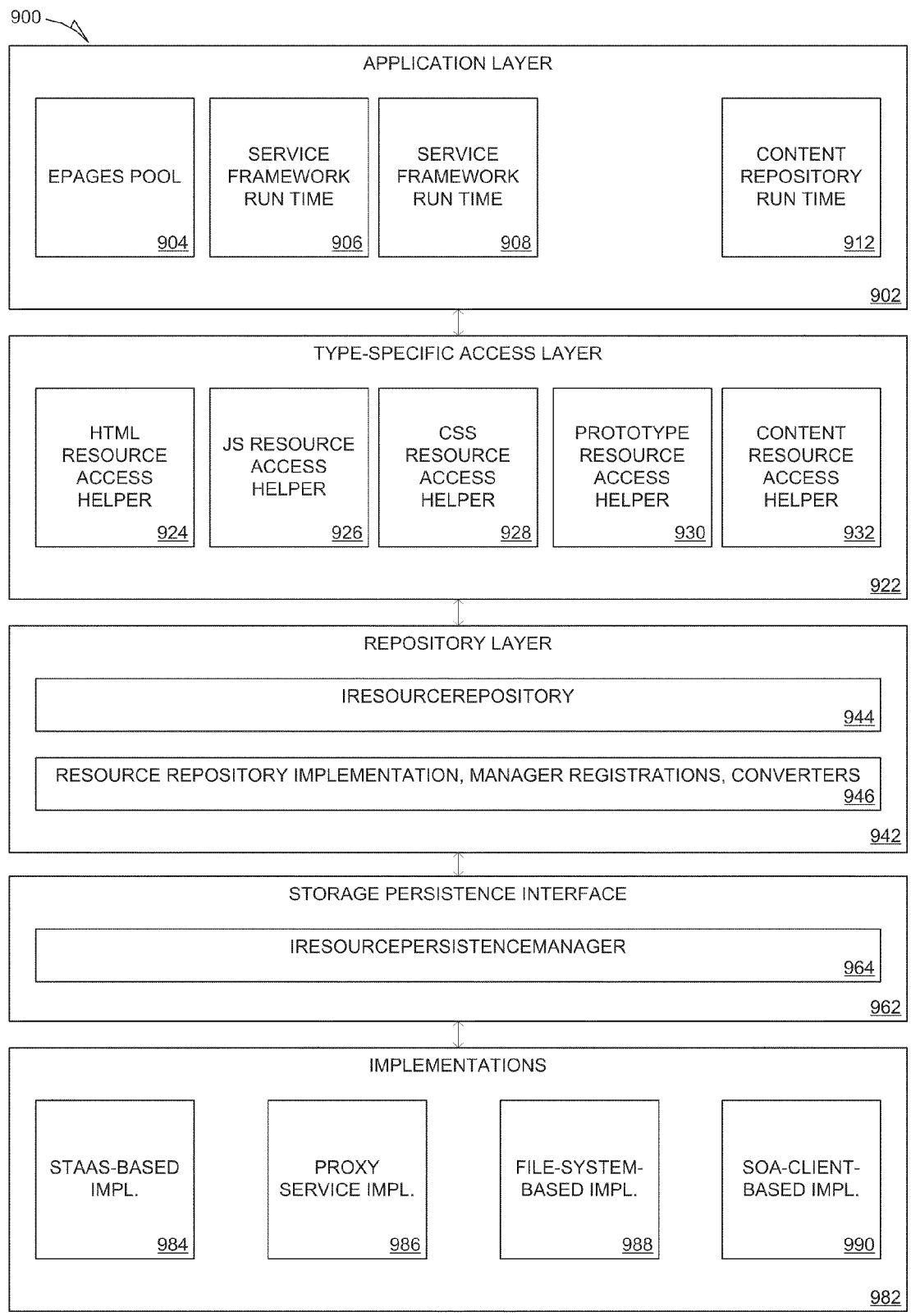
FIG. 9 is a block diagram of an example embodiment of an architecture of a resource framework.

The configuring module 268 of FIG. 2D may also manage storage and retrieval of resources associated with the widget 1 112. For example, the configuring module 268 may use a resource framework to store and retrieve the resources. FIG. 9 is a block diagram of an example embodiment of an architecture 900 of the resource framework. The resource framework may include an application layer 902, a type-specific access layer 922, a repository layer 942, a storage persistence interface 962, or various implementations 982 of storage repositories or systems. The application layer 902 may provide applications (e.g., ePages 904, services framework run-time 906 component, services framework run-time 908 component, or content repository run-time 912 component, with accesses to the resources at run time (e.g., through an application-level API).

The type-specific access layer 922 may help in a translating between the application-layer 902 API and a repository-layer 942 API. For example, the type-specific access layer 922 may include helpers associated with various resource types (e.g., an HTML resource access helper 924, a JavaScript resource access helper 926, a CSS resource access helper 928, a prototype resource access helper 930, a content resource access helper 932, and so on.).

The repository layer 942 may include a repository-level API (e.g., IresourceRepository 944) to manage storage of the resources in memory (e.g., volatile memory). The repository-level API may be associated with a resource repository implementation 946 that supports registration of adapters to legacy resources, a serializer, or a converter. In this way, the repository-level API may support using a same referencing model across multiple owners or legacy systems. The repository-level API may support a definition of a repository structure logical keys of resource). The repository-level API may support conversions or serializations of the resources between various formats (e.g., between a volatile memory format and a non-volatile memory format, between a legacy system format and a current system format, or between other formats). The repository-level API may be a JAVA™-based type-safe wrapper of underlying resource repositories. The repository-level API may include a resolver to support mappings between logical and physical keys. The resolver may be resource-pattern aware. For example, the resolver may support permutations (e.g., sites or locales), versioning (e.g., release "train" numbers), lifecycle states (e.g., a review state or a production state) or compatibility management. The repository-level API may support infoset-based persistence, leveraging fast or compact binary XML serializations; support for granular target, overrides, binding, or layering attributes; or a pluggable serializer or deserializer. The pluggable serializer or deserializer may not be coupled to the metamodel framework. The repository-level API may support a tracer to trace resource usage. The repository-level API may also support management of instances of data types (e.g., managed data). The repository-level API 944 may apply resources to type-safe KVC objects as well as generic objects. The repository-level may also expose definitions of objects (e.g., type declarations) to be edited (e.g., via a tool).

The repository layer 942 may be associated with a storage persistence interface 962. The storage persistence interface 962 may include a persistence-manager API (e.g., IResourcePersistenceManager 964) to provide a common API to the underlying persistent (e.g., non-volatile) storage implementations 982, which may include a storage-as-a-service (StaaS)-based implementation 984, a proxy-service implementation 986, a file-system-based implementation 988, or a service-oriented-architecture (SOA) client-based implementation 990. The Staas-based implementation 984 may support hot deployment and fast roll-out or roll-back (e.g., data center replication) or run-time source of truth (e.g., UGC) and override support). The proxy server may include a fetcher or a local disk cache (e.g., for high performance). The SOA client-based implementation 990 may, in turn, be based on one or more SOA services (not shown) or an additional StaaS-based implementation (not shown). The management of the storage and retrieval of the resources may be performed at run time.

Thus, an example embodiment of the architecture 900 of the resource framework may include a resource repository that provides uniform API to access resources but allows for an addition of type-specific APIs, a resource persistence service that provides pluggable persistence mechanisms, or a prototype resource repository as an out-of-the-box solution from design time to run time. In this way, the example embodiment of the architecture 900 may extend best practices and features to most resource types, be easy or cheap to maintain or troubleshoot, or provide an easy go-to solution for most configuration externalization needs.

Figure 10:
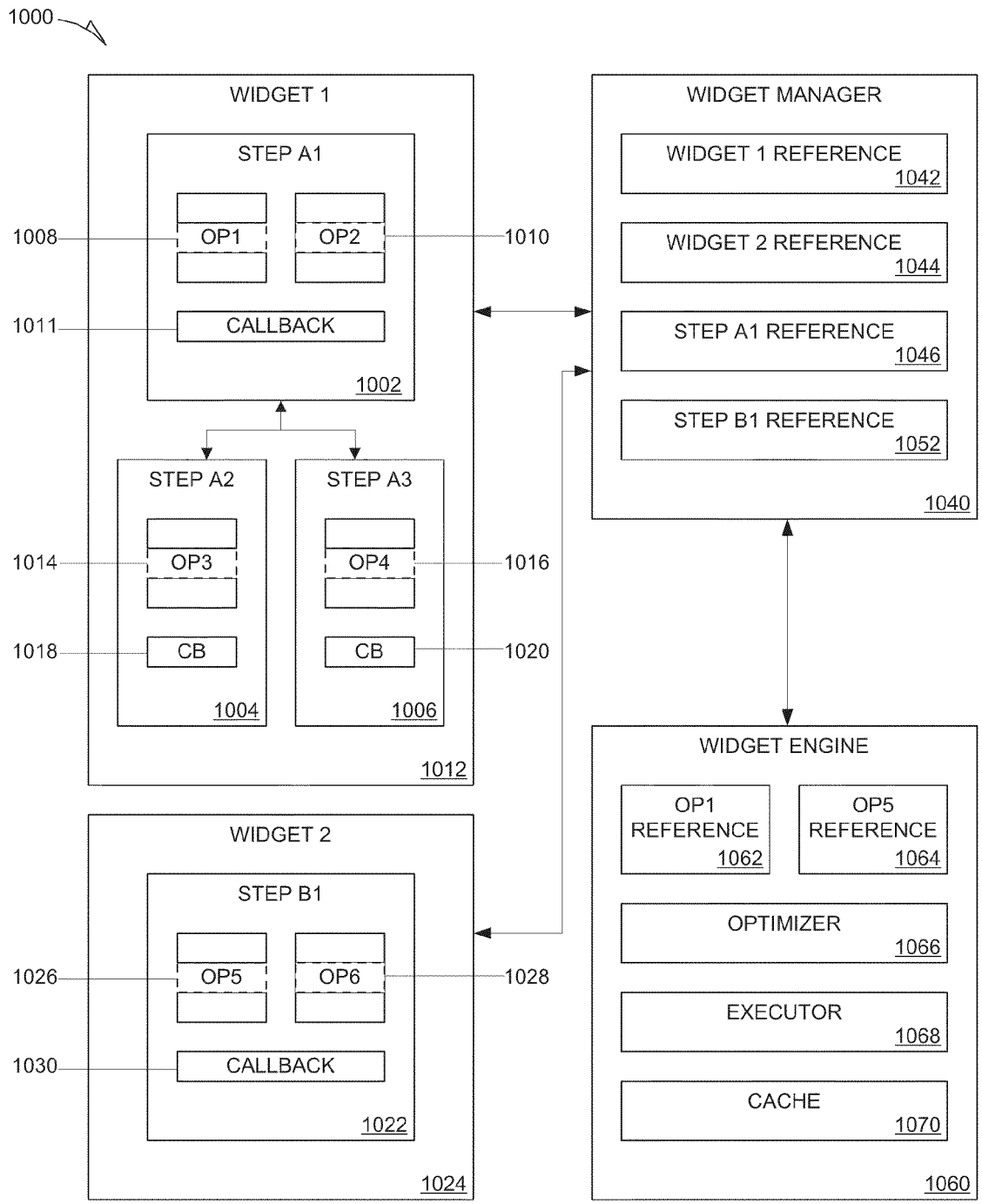
FIG. 10 is a block diagram of two widgets interacting with elements of an example widget framework.

FIG. 10 is a block diagram of two widgets interacting with elements of an example widget framework 1000. A first one of the two widgets, widget 1 1012, may include step A1 1002, step A2 1004, or step A3 1006, Step A1 1002 may include operation 1 (OP1) 1008, operation 2 (OP2) 1010, or callback 1011. Step A2 1004 may include operation 3 (OP3) 1014 and callback (CB) 1018, Step A3 1006 may include operation 4 (OP4) 1016 and callback 1020. OP2 1010 may include a call to a second service. OP1 1008, OP2 1010, OP3 1014, and OP4 1016 may include a call to a first service, a second service, a third service, and a fourth service, respectively. Callback 1011 may be a function that a widget manager 1040 calls in response to an execution of the first call or the second call. Callback 1018 may be a callback function that the widget manager 1040 calls in response to an execution of the third call. Callback 1020 may be a function that the widget manager 1040 calls in response to an execution of the fourth call. A second one of the two widgets, widget 1024, may include step B1 1022. Step B1 may include operation 5 (OP5) 1026, operation 6 (OP6) 1028, and callback 1030. OP5 1026 and OP6 1028 may include a call to a fifth service and a sixth service, respectively.

The widget manager 1040 may manage widget 1 1012 and widget 2 1024, including their lifecycles or run-time operation. The widget manager 1040 may include a reference 1042 to widget 1 1012 or a reference 1044 to widget 2 1024. Furthermore, the widget manager 1040 may include references to steps within each widget. For example, the widget manager 1040 may include a reference 1046 to step A1 1022 or a reference 1052 to step B1 1022. The widget manager 1040 may intercept a call from a widget to a service and forward the call to a widget engine 1060.

The widget engine 1060 may handle the processing of one or more calls by a widget. For example, the widget engine 1060 may receive a reference 1062 to OP1 1008 or a reference 1064 to OP5 1026 from the widget manager 1040 (e.g., in response to an intercepting by the widget manager 1040 of a call by widget 1 1012 to OP1 1008 or a call by widget 2 1024 to OP5 1026. The widget engine 1060 may include an optimizer 1066, an executor 1068, or a cache 1070. The optimizer 1066 may optimize the calls as discussed above with reference to FIG. 2A and FIG. 2B. The executor 1068 may execute the one or more calls serially or in parallel as discussed above with reference to FIG. 2B. The cache 1070 may be a memory (e.g., a volatile memory having a higher speed than other system memories) in which the widget engine 1060 caches a result of a call as discussed above with respect to FIG. 2B. The widget engine 1060 may include a module (not shown) to receive information about calls to process or send information about calls that have been processed (e.g., response or reply data). The widget engine 1060 may provide a response to one or more calls based on a processing of a result of an optimized call as discussed above with respect to FIG. 2A and FIG. 2B.

Figure 11:
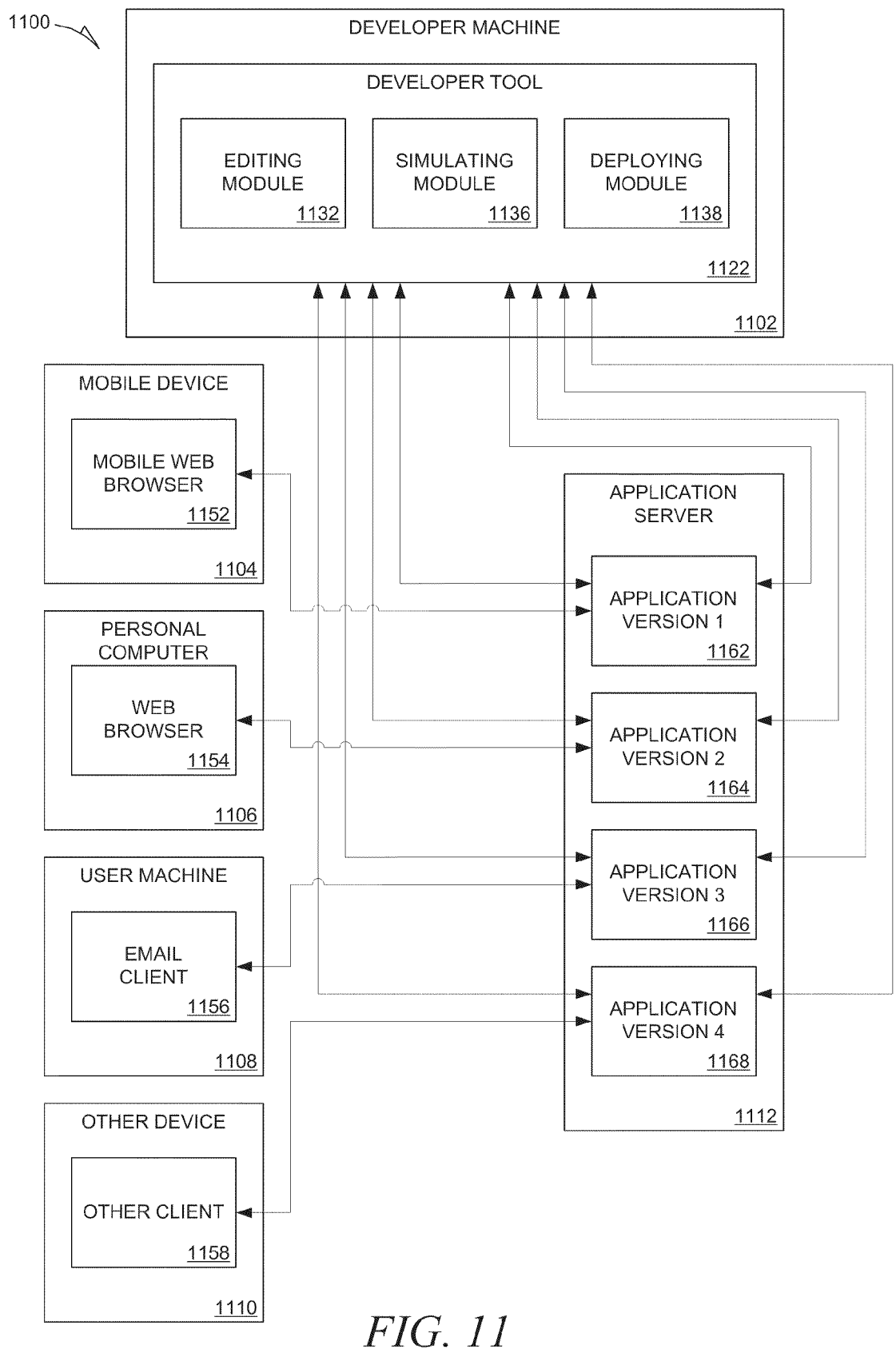
FIG. 11 is a block diagram of interactions between an example developer tool for developing various versions of an application that may be associated with various respective clients of the application.

FIG. 11 is a block diagram of interactions 1100 between an example developer tool 1122 for developing various versions (e.g., version 1 1162, version 2 1164, version 3 1166, or version 4 1168) of an application (e.g., the application 104 of FIG. 1B) that may be associated with various respective clients of the application (e.g., mobile web browser 1152, web browser 1154, email client 1156, or other client 1158. The developer tool 1122 may be running on a developer machine 1102 that is communicatively coupled to the application server 1112. The various versions of the application may be running on the application server 1112. The mobile web browser 1152 may be running on a mobile device 1104, the web browser 1154 may be running on a personal computer 1106, the email client 1156 may be running on a user machine 1108, and the other client 1158 may be running on other device 1110. The various clients may be communicatively coupled to the application server 1112.

The developer tool 1122 may include an editing module 1132, a simulating module 1136, or a deploying module 1138. The editing module 1132 may be capable of exposing the configurable attributes of a component (e.g., widget 1 112 of FIG. 2D) for editing. That is, the editing module 1132 may be capable of interfacing with the configuring module 268 of FIG. 2D (discussed above) to discover configurable attributes, or the metadata associated with the configurable attributes (e.g., metadata definitions), for editing. The editing module 1132 may be capable of configuring the component at run time (e.g., via rapid deployment using the deploying module 1138).

The developer tool 1122 may include a simulating module 1136 that enables a simulation of the application (or specific components of the application or specific versions of the application) without requiring a deployment of the application. For example, the simulating module 1136 may be a web browser (e.g., FIREFOX®) extension that allows the application to run in the web browser. The extension may be separate from a JAVA™ virtual machine (JVM) such that the NM does not have to run on a same machine as the web browser extension (e.g., in contrast, applets require the NM on the machine where they are running). The application may interact with web pages and control browser menus. The simulating module 1136 may not use applets. The simulating module 1136 may have visibility into browser menus and web page tabs. The security model of the simulating module 1136 may not be as restrictive as applets (file input or output, cross-domain, etc.). The simulating module 1136 may be designed for highly interactive web page applications. The simulating module 1136 may support manipulating web pages with a JAVA™-based Document Object Model (DOM), handling DOM events in JAVA™ (e.g., DOM events may be normalized before they get to JAVA™; therefore browser-specific behavior of events (or event data) may be reduced), handling browser start or stop, page load or unload or tab events, changing the tools and right-click menus, receiving events from menus, persisting or accessing data at browser and simulating-module 1136 levels, sending arbitrary JavaScript to a web page, receiving back return values associated with the sending of the arbitrary JavaScript, discovering, installing, or managing applications with an application manager (e.g., applications may be distributed through a standard HTTP URL), or accessing a built-in library of convenient UI features. The application manager may use an OSGi framework or be associated with an OSGi-provided manifest.fm options. Thus, the application may be a .jab file (e.g., a .jar file with an OSGi manifest.fm file and a custom install.rdf file). The communication between JAVA™ and the simulating module 1136 may be done with a platform-independent messaging standard (e.g., DLC). Components of the application server 1112 may be deployed on the developer machine 1102 or a machine more closely communicatively coupled to the developer machine 1102 than the application server 1112, such that the developer tool 1122 may communicate with the components (e.g., an element of the application server) deployed on the developer machine 1102 instead of the application server 1112. Thus, the simulating module 1136 may closely simulate the deployment of the application without communicating over a slower communication channel between the developer tool 1122 and the application server 1112.

FIG. 12A is a source code listing 1200 of an example HTML page (e.g., demo.html) associated with the simulating module 1136. FIG. 12B is a source code listing 1220 of an example JAVA™ test client (e.g., TestClient.java). FIG. 12C is a JAVA™ console log 1240 associated with a running of the example HTML page and the JAVA™ test client in a web browser. FIG. 12D is an example user interface 1260 of the simulating module 1136 simulating a deployment of the example HTML page on the application server.

Figure 13A:
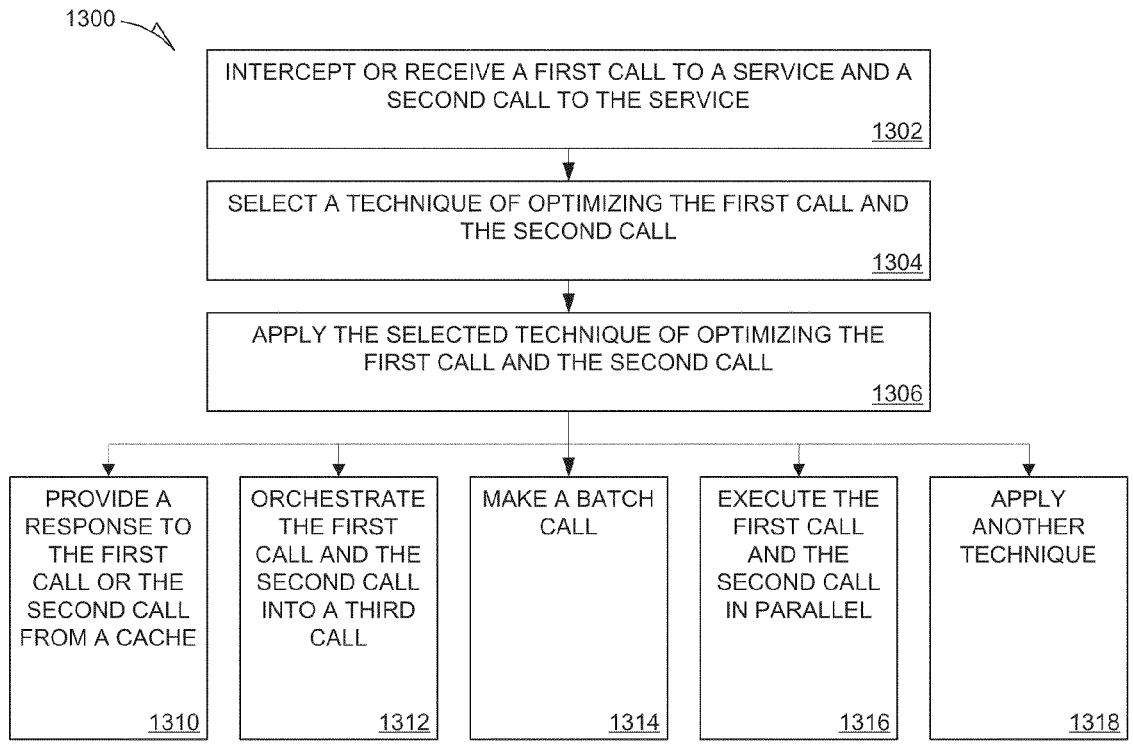
FIG. 13A is a flowchart of an example method of optimizing calls from the components of the application to a service.

FIG. 13A is a flowchart of an example method 1300 of optimizing calls from the components of the application to a service. The method 1300 may include intercepting 1302 a first call to the service and a second call to the service, selecting 1304 a technique of optimizing the first call and the second call, or applying 1306 the selected technique of optimizing the first call and the second call. The techniques may include providing 1310 a response to the first call to the second call from a cache, orchestrating 1312 the first call and the second call into the third call, making 1314 a batch call, executing 1316 the first call and the second call in parallel, or applying 1318 another technique (e.g., applying a combination of the discussed techniques).

Figure 13B:
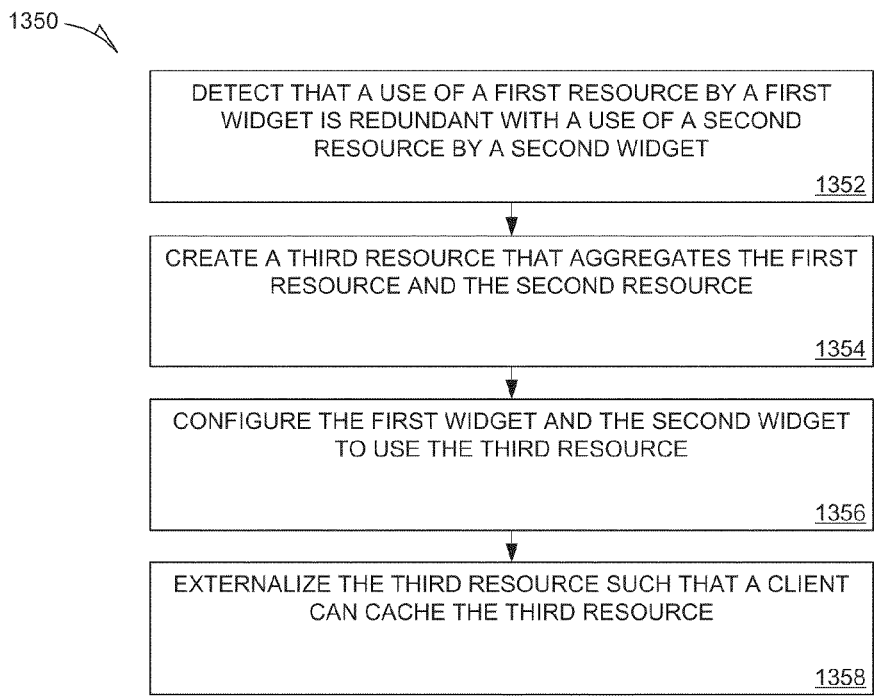
FIG. 13B is a flowchart of an example method for aggregating resources used by the components of the application.

FIG. 13B is a flowchart of an example method 1350 for aggregating resources used by the components of the application. The method 1350 may include detecting 1352 that a use of a first resource by a first widget is redundant with a use of a second resource by a second widget, creating 1354 a third resource that aggregates first resource and the second resource, configuring 1356 the first widget and the second widget to use the third resource, or externalizing 1358 the third resource such that a client can cache the third resource.

Figure 14:
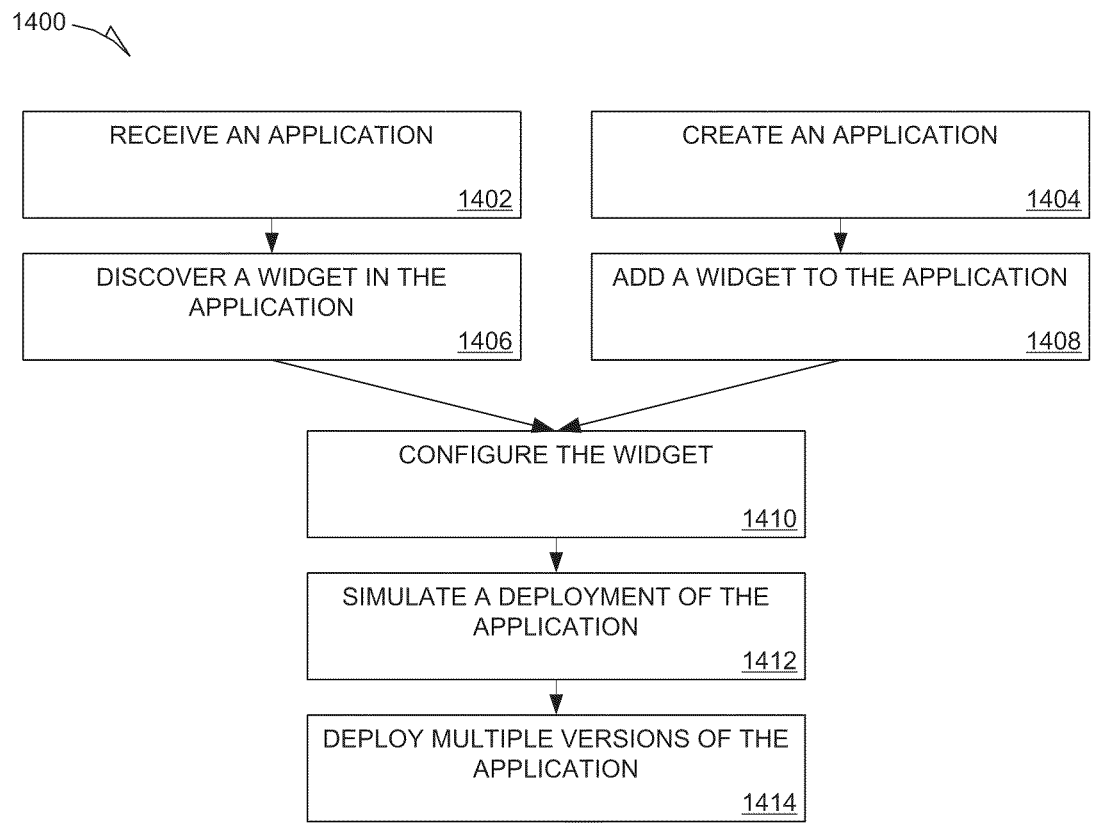
FIG. 14 is an example method for designing, editing, configuring, testing, or deploying multiple versions of the application.

FIG. 14 is an example method 1400 for designing, editing, configuring, testing, or deploying multiple versions of the application. The method 1400 may include receiving 1402 an application, creating 1404 an application, discovering 1406 a widget in the application, adding 1408 a widget to the application, configuring the widget 1410, simulating a deployment of the application 1412, or deploying multiple versions of the application 1414.

Architecture

Figure 15:
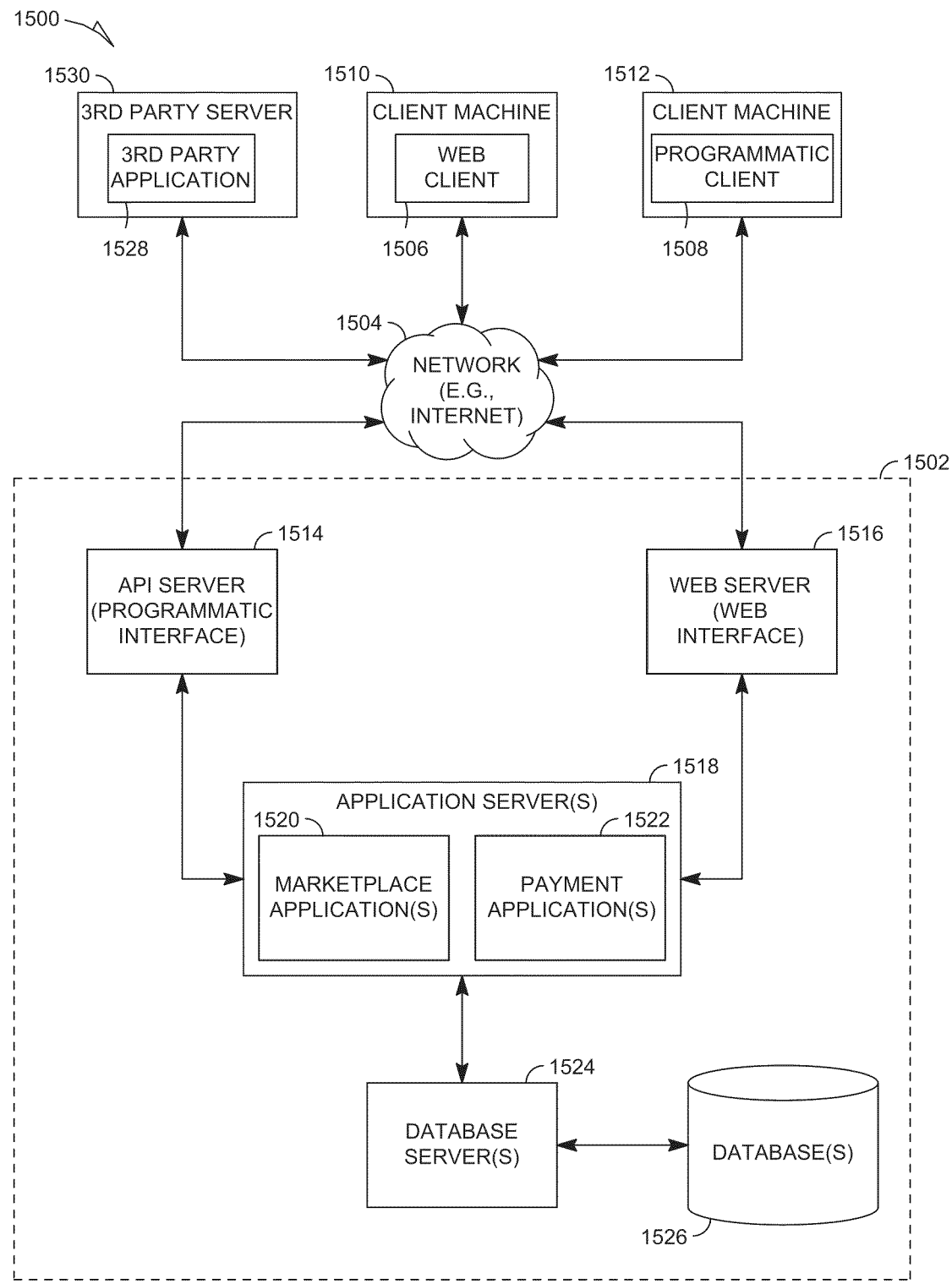
FIG. 15 is a network diagram depicting a client-server system, within which various example embodiments may be deployed.

FIG. 15 is a network diagram depicting a client-server system 1500, within which various example embodiments may be deployed. A networked system 1502, in the example forms of a network-based marketplace or other publication system, provides server-side functionality via a network 1504 (e.g., the Internet or Wide Area Network (WAN)) to one or more clients. FIG. 15 illustrates, for example, a web client 1506 (e.g., a browser, such as the INTERNET EXPLORER® browser developed by MICROSOFT® Corporation of Redmond, Wash.) and a programmatic client 1508 executing on respective client machines 1510 and 1512.

An Application Program Interface (API) server 1514 and a web server 1516 are coupled to, and provide programmatic and web interfaces respectively to, one or more application servers 1518. The application servers 1518 host one or more marketplace applications 1520 and payment applications 1522. The application servers 1518 are, in turn, shown to be coupled to one or more databases servers 1524 that facilitate access to one or more databases 1526.

The marketplace applications 1520 may provide a number of marketplace functions and services to users that access the networked system 1502. The payment applications 1522 may likewise provide a number of payment services and functions to users. The payment applications 1522 may allow users to accumulate value (e.g., in a commercial currency, such as the U.S. dollar, or a proprietary currency, such as "points") in accounts, and then later redeem the accumulated value for products (e.g., goods or services) that are made available via the marketplace applications 1520. While the marketplace and payment applications 1520 and 1522 are shown in FIG. 15 to both form part of the networked system 1502, it will be appreciated that, in alternative embodiments, the payment applications 1522 may form part of a payment service that is separate and distinct from the networked system 1502.

Further, while the system 1500 shown in FIG. 15 employs a client-server architecture, the present disclosure is, of course, not limited to such an architecture, and could equally well find application in a distributed, or peer-to-peer, architecture system, for example. The various marketplace and payment applications 1520 and 1522 could also be implemented as standalone software programs, which do not necessarily have networking capabilities.

The web client 1506 accesses the various marketplace and payment applications 1520 and 1522 via the web interface supported by the web server 1516. Similarly, the programmatic client 1508 accesses the various services and functions provided by the marketplace and payment applications 1520 and 1522 via the programmatic interface provided by the API server 1514. The programmatic client 1508 may, for example, be a seller application (e.g., the TurboLister application developed by eBay Inc., of San Jose, Calif.) to enable sellers to author and manage listings on the networked system 1502 in an off-line manner, and to perform batch-mode communications between the programmatic client 1508 and the networked system 1502.

FIG. 15 also illustrates a third-party application 1528, executing on a third-party server machine 1530, as having programmatic access to the networked system 1502 via the programmatic interface provided by the API server 1514. For example, the third-party application 1528 may, utilizing information retrieved from the networked system 1502, support one or more features or functions on a website hosted by the third party. The third-party website may, for example, provide one or more promotional, marketplace or payment functions that are supported by the relevant applications of the networked system 1502.

Figure 16:
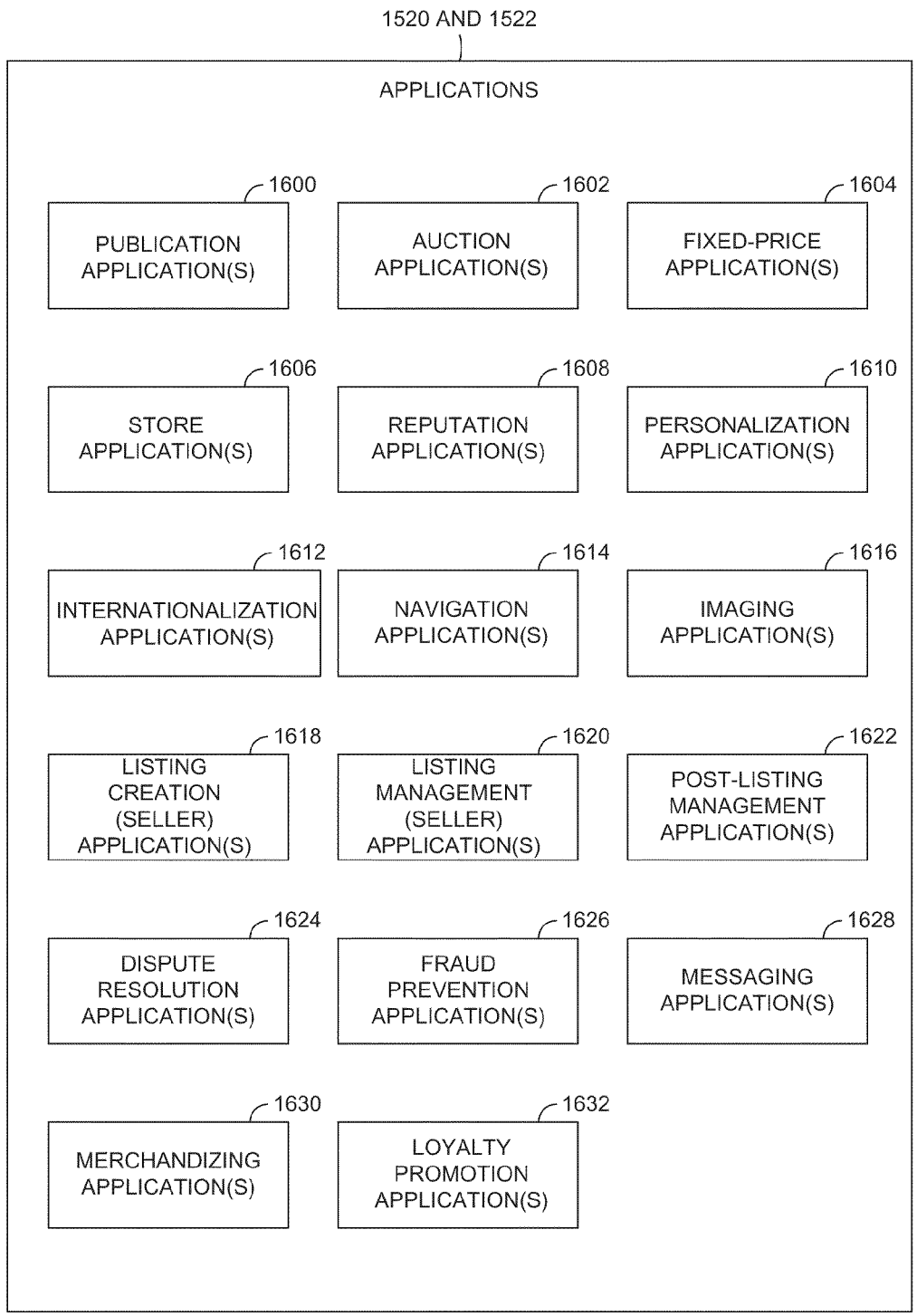
FIG. 16 is a block diagram illustrating multiple applications that, in one example embodiment, are provided as part of the networked system.

FIG. 16 is a block diagram illustrating multiple applications 1520 and 1522 that, in one example embodiment, are provided as part of the networked system 1502. The applications 1520 and 1522 may be hosted on dedicated or shared server machines (not shown) that are communicatively coupled to enable communications between server machines. The applications 1520 and 1522 themselves are communicatively coupled (e.g., via appropriate interfaces) to each other and to various data sources, so as to allow information to be passed between the applications 1520 and 1522, or so as to allow the applications 1520 and 1522 to share and access common data. The applications 1520 and 1522 may furthermore access one or more databases 1526 via the database servers 1524 of FIG. 15.

The networked system 1502 (FIG. 15) may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, in FIG. 16 the marketplace and payment applications 1520 and 1522 are shown to include at least one publication application 1600 and one or more auction applications 1602 which support auction-format listing and price setting mechanisms (e.g., English, Dutch, Vickrey, Chinese, Double, Reverse auctions etc.). The various auction applications 1602 may also provide a number of features in support of such auction-format listings, such as a reserve price feature whereby a seller may specify a reserve price in connection with a listing, and a proxy-bidding feature whereby a bidder may invoke automated proxy bidding.

A number of fixed-price applications 1604 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 1606 allow a seller to group listings within a "virtual" store, which may be branded and otherwise personalized by and for the seller. Such a virtual store may also offer promotions, incentives and features that are specific and personalized to a relevant seller.

Reputation applications 1608 allow users that transact, utilizing the networked system 1502, to establish, build and maintain reputations, which may be made available and published to potential trading partners. Consider that where, for example, the networked system 1502 supports person-to-person trading, users may otherwise have no history or other reference information whereby the trustworthiness and credibility of potential trading partners may be assessed. The reputation applications 1608 allow a user (for example through feedback provided by other transaction partners) to establish a reputation within the networked system 1502 over time. Other potential trading partners may then reference such a reputation for the purposes of assessing credibility and trustworthiness.

Personalization applications 1610 allow users of the networked system 1502 to personalize various aspects of their interactions with the networked system 1502. For example a user may, utilizing an appropriate personalization application 1610, create a personalized reference page at which information regarding transactions to which the user is (or has been) a party may be viewed. Further, a personalization application 1610 may enable a user to personalize listings and other aspects of their interactions with the networked system 1502 and other parties.

The networked system 1502 may support a number of marketplaces that are customized, for example, for specific geographic regions. A version of the networked system 1502 may be customized for the United Kingdom, whereas another version of the networked system 1502 may be customized for the United States. Each of these versions may operate as an independent marketplace, or may be customized (or internationalized) presentations of a common underlying marketplace. The networked system 1502 may accordingly include a number of internationalization applications 1612 that customize information (and/or the presentation of information) by the networked system 1502 according to predetermined criteria (e.g., geographic, demographic or marketplace criteria). For example, the internationalization applications 1612 may be used to support the customization of information for a number of regional websites that are operated by the networked system 1502 and that are accessible via respective web servers 1516 (FIG. 15).

Navigation of the networked system 1502 may be facilitated by one or more navigation applications 1614. In order to make listings available via the networked system 1502 as visually informing and attractive as possible, the marketplace and payment applications 1520 and 1522 may include one or more imaging applications 1616 which users may utilize to upload images for inclusion within listings. An imaging application 1616 also operates to incorporate images within viewed listings. The imaging applications 1616 may also support one or more promotional features, such as image galleries that are presented to potential buyers. For example, sellers may pay an additional fee to have an image included within a gallery of images for promoted items.

Listing creation applications 1618 allow sellers to conveniently author listings pertaining to goods or services that they wish to transact via the networked system 1502, and listing management applications 1620 allow sellers to manage such listings. Specifically, where a particular seller has authored and/or published a large number of listings, the management of such listings may present a challenge. The listing management applications 1620 provide a number of features (e.g., auto-relisting, inventory level monitors, etc.) to assist the seller in managing such listings. One or more post-listing management applications 1622 also assist sellers with a number of activities that typically occur post-listing. For example, upon completion of an auction facilitated by one or more auction applications 1602, a seller may wish to leave feedback regarding a particular buyer. To this end, a post-listing management application 1622 may provide an interface to one or more reputation applications 1608, so as to allow the seller to conveniently provide feedback regarding multiple buyers to the reputation applications 1608.

Dispute resolution applications 1624 provide mechanisms whereby disputes arising between transacting parties may be resolved. For example, the dispute resolution applications 1624 may provide guided procedures whereby the parties are guided through a number of operations in an attempt to settle a dispute. In the event that the dispute cannot be settled via the guided procedures, the dispute may be escalated to a third party mediator or arbitrator.

A number of fraud prevention applications 1626 implement fraud detection and prevention mechanisms to reduce the occurrence of fraud within the networked system 1502.

Messaging applications 1628 are responsible for the generation and delivery of messages to users of the networked system 1502. These messages may, for example, advise users regarding the status of listings at the networked system 1502 (e.g., providing "outbid" notices to bidders during an auction process or providing promotional and merchandising information to users). Respective messaging applications 1628 may utilize any one of a number of message delivery networks and platforms to deliver messages to users. For example, messaging applications 1628 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 1630 support various merchandising functions that are made available to sellers to enable sellers to increase sales via the networked system 1502. The merchandising applications 1630 also operate the various merchandising features that may be invoked by sellers, and may monitor and track the success of merchandising strategies employed by sellers.

The networked system 1502 itself, or one or more parties that transact via the networked system 1502, may operate loyalty programs that are supported by one or more loyalty/promotion applications 1632. For example, a buyer may earn loyalty or promotions points for each transaction established and/or concluded with a particular seller, and may be offered a reward for which accumulated loyalty points can be redeemed.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 17:
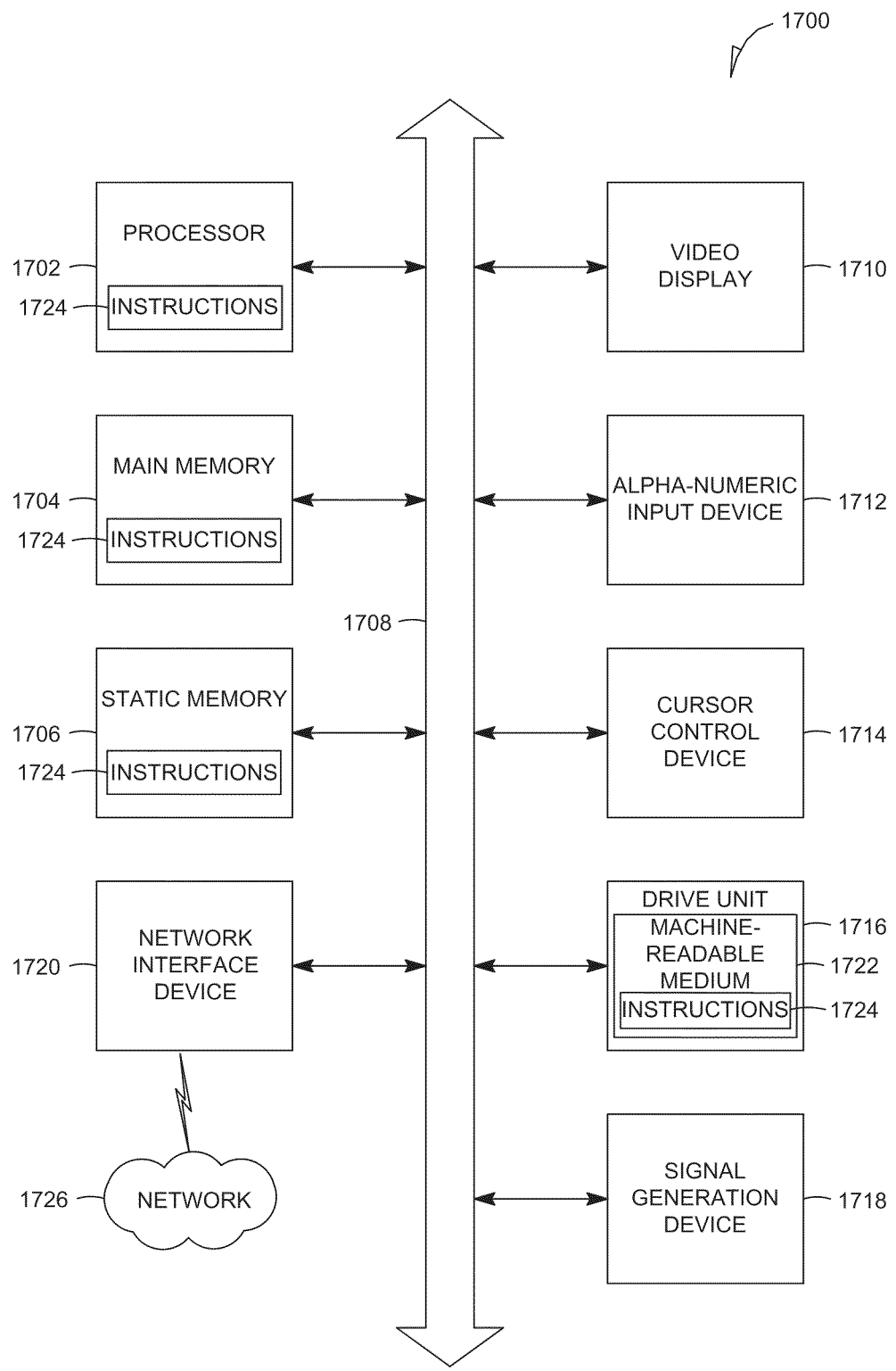
FIG. 17 is a block diagram of a machine on which an example embodiment may be executed.

FIG. 17 is a block diagram of machine in the example form of a computer system 1700 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1700 includes a processor 1702 (e.g., a central processing unit (CPU), a graphics processing unit (GPU) or both), a main memory 1704 and a static memory 1706, which communicate with each other via a bus 1708. The computer system 1700 may further include a video display unit 1710 (e.g., a liquid crystal display (LCD) or a cathode ray tube (CRT)). The computer system 1700 also includes an alphanumeric input device 1712 (e.g., a keyboard), a user interface (UI) navigation (or cursor control) device 1714 (e.g., a mouse), a disk drive unit 1716, a signal generation device 1718 (e.g., a speaker) and a network interface device 1720.

Machine-Readable Medium

The disk drive unit 1716 includes a machine-readable medium 1722 on which is stored one or more sets of instructions 1724 and data structures (e.g., software) embodying or utilized by any one or more of the methodologies or functions described herein. The instructions 1724 may also reside, completely or at least partially, within the main memory 1704 and/or within the processor 1702 during execution thereof by the computer system 1700, the main memory 1704 and the processor 1702 also constituting machine-readable media. The instructions 1724 may also reside, completely or at least partially, within the static memory 1706.

While the machine-readable medium 1722 is shown in an example embodiment to be a single medium, the term "machine-readable medium" may include a single medium or multiple media (e.g., a centralized or distributed database, and/or associated caches and servers) that store the one or more instructions 1724 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1724 may further be transmitted or received over a communications network 1726 using a transmission medium. The instructions 1724 may be transmitted using the network interface device 1720 and any one of a number of well-known transfer protocols (e.g., Hyper Text Transfer Protocol or HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
one or more hardware processors configured to include:
a call optimizer associated with an application running on an application server, the application including a plurality of widgets, the call optimizer comprising:
an intercepting module to intercept a first call and a second call, the first call made to a service by a first one of the plurality of widgets and the second call made to the service by a second one of the plurality of widgets,
an optimization-selecting module to select an optimization technique of a plurality of optimization techniques based on an amount of time the optimization technique takes to process calls, the plurality of optimization techniques including orchestrating at run time of the application the first call and the second call into a third call to the service, and
an orchestrating module to:
orchestrate at run time of the application the first call and the second call into the third call;
receive a result of the third call;
identify a first part of the result as corresponding to the first call;
identify a second part of the result as corresponding to the second call;
provide the first part of the result to the first one of the plurality of widgets as a response to the first call, based on a determination that the first one of the plurality of widgets made the first call; and
provide the second part of the result to the second one of the plurality of widgets as a response to the second call, based on a determination that the second one of the plurality of widgets made the second call; and a resource aggregator associated with the application, the resource aggregator comprising:
an identifying module to identify that at least a portion of a first resource is redundant with at least a portion of a second resource, the first resource being used by the first one of the plurality of widgets and the second resource being used by the second one of the plurality of widgets, and
an aggregating module to, in response to identifying that at least the portion of the first resource is redundant with at least the portion of the second resource, aggregate the first resource and the second resource into a third resource.

2. The system of claim 1, wherein the orchestrating module is configured to:
integrate a plurality of request parameters of the first call into a plurality of request parameters of the third call;
integrate a plurality of request parameters of the second call into the plurality of request parameters of the third call; and
make the third call.

3. The system of claim 1, the resource aggregator further comprising:
an updating module to, in response to the aggregating, update the application to use the third resource, the updating of the application removing a dependency of the application on the redundant portion of the first resource or the redundant portion of the second resource.

4. The system of claim 3, wherein the first resource is a first version of a cascading style sheet and the second resource is a second version of the cascading style sheet.

5. The system of claim 1, further comprising a first client of the application server, the first client comprising a simulating module to simulate on the first client a deployment of the application onto the application server, the simulating module capable of communicating with an element installed on the client instead of communicating with the application server.

6. The system of claim 5, wherein the first client further comprises a deploying module to deploy a plurality of versions of the application on the application server, a first one of the plurality of versions being adapted to a second client and a second one of the plurality of versions being adapted to a third client, the second client running on a mobile device and the third client running on a personal computer.

7. A system comprising:
one or more hardware processors configured to include:
a call optimizer associated with an application running on an application server, the application including a plurality of widgets, the call optimizer comprising:
an intercepting module to intercept a first call and a second call, the first call made to a service by a first one of the plurality of widgets and the second call made to the service by a second one of the plurality of widgets,
an optimization-selecting module to select an optimization technique of a plurality of optimization techniques based on an amount of time the optimization technique takes to process calls, the plurality of optimization techniques including orchestrating at run time of the application the first call and the second call into a third call to the service, and an orchestrating module to, in response to the selecting of the orchestrating at run time of the application the first call and the second call into the third call as the optimization technique:
orchestrate at run time of the application the first call and the second call into the third call;
receive a result of the third call;
identify a first part of the result as corresponding to the first call;
identify a second part of the result as corresponding to the second call;
provide the first part of the result to the first one of the plurality of widgets as a response to the first call, based on a determination that the first one of the plurality of widgets made the first call; and
provide the second part of the result to the second one of the plurality of widgets as a response to the second call, based on a determination that the second one of the plurality of widgets made the second call.

8. The system of claim 7, wherein the plurality of optimization techniques includes making a fourth call to the service, the fourth call being a batch call, a first part of a result of the batch call being usable as a response to the first call and a second part of the result of the batch call being usable as a response to the second call, and wherein the system further comprises a batching module to, in response to a selecting of the making of the fourth call as the optimization technique,
make the fourth call;
provide the first part of the result to the first one of the plurality of widgets as the response to the first call, based on a determination that the first one of the plurality of widgets made the first call; and
provide the second part of the result to the second one of the plurality of widgets as the response to the second call, based on a determination that the second one of the plurality of widgets made the second call.

9. The system of claim 8, wherein the selecting of the making of the fourth call as the optimization technique is based on a determination that the service has provided an interface corresponding to the fourth call.

10. The system of claim 8, wherein the selecting of the making of the fourth call as the optimization technique is based on a determination that the making of the fourth call would take less time than the orchestrating at run time of the application the first call and the second call into the third call.

11. The system of claim 7, wherein the plurality of optimization techniques includes providing a response to the first call from a cache such that the first call need not be made, and wherein the system further comprises a caching module to, in response to a selecting of the providing of the response to the first call from the cache as the optimization technique, provide the response to the first call from the cache.

12. The system of claim 11, wherein the selecting of the providing of the response to the first call from the cache as the optimization technique is based on a determination that the first call is identical to the third call, a making of the third call having resulted in a receiving of the response.

13. The system of claim 7, wherein the plurality of optimization techniques includes making the first call and the second call in parallel, and wherein the system further comprises an executing module to, in response to a selecting of the making of the first call and the second call in parallel as the optimization technique, make the first call and second call in parallel.

14. The system of claim 13, wherein the selecting of the making of the first call and the second call in parallel as the optimization technique is based on a determination that making the first call and the second call in parallel would take less time than the orchestrating at run time of the application the first call and the second call into the third call.

15. A method comprising:
  receiving a first call and a second call, the first call made to a service by a first one of a plurality of widgets included in an application running on an application server, and the second call made to the service by a second one of the plurality of widgets;
  selecting an optimization technique of a plurality of optimization techniques based on an amount of time the optimization technique takes to process calls, the plurality of optimization techniques including orchestrating at run time of the application the first call and the second call into a third call to the service; and
  in response to the selecting of the orchestrating at run time of the application the first call and the second call into the third call as the optimization technique:
    orchestrating at run time of the application, by one or more hardware processors, the first call and the second call into the third call;
    receiving a result of the third call;
    identifying a first part of the result as corresponding to the first call;
    identifying a second part of the result as corresponding to the second call;
    providing the first part of the result to the first one of the plurality of widgets as a response to the first call, based on a determination that the first one of the plurality of widgets made the first call; and
    providing the second part of the result to the second one of the plurality of widgets as a response to the second call, based on a determination that the second one of the plurality of widgets made the second call.

16. The method of claim 15, wherein the orchestrating at run time of the application the first call and the second call into the third call comprises:
  integrating a plurality of request parameters of the first call into a plurality of request parameters of the third call;
  integrating a plurality of request parameters of the second call into the plurality of request parameters of the third call; and
  making the third call.

17. The method of claim 15, wherein the plurality of optimization techniques includes making a fourth call to the service, the fourth call being a batch call, a first part of a result of the batch call being usable as a response to the first call and a second part of the result of the batch call being usable as a response to the second call, and wherein the method further comprises, in response to a selecting of the making of the fourth call as the optimization technique,
  making the fourth call;
  providing the first part of the result to the first one of the plurality of widgets as the response to the first call, based on a determination that the first one of the plurality of widgets made the first call; and
  providing the second part of the result to the second one of the plurality of widgets as the response to the second call, based on a determination that the second one of the plurality of widgets made the second call.

18. A non-transitory machine-readable storage medium comprising instructions that, when executed by one or more processors of a machine, causes the machine to perform operations comprising:
  receiving a first call and a second call, the first call made to a service by a first one of a plurality of widgets included in an application running on an application server, and the second call made to the service by a second one of the plurality of widgets;
  selecting an optimization technique of a plurality of optimization techniques based on an amount of time the optimization technique takes to process calls, the plurality of optimization techniques including orchestrating at run time of the application the first call and the second call into a third call to the service; and
  in response to the selecting of the orchestrating at run time of the application the first call and the second call into the third call as the optimization technique:
    orchestrating at run time of the application the first call and the second call into the third call;
    receiving a result of the third call;
    identifying a first part of the result as corresponding to the first call;
    identifying a second part of the result as corresponding to the second call;
    providing the first part of the result to the first one of the plurality of widgets as a response to the first call, based on a determination that the first one of the plurality of widgets made the first call; and
    providing the second part of the result to the second one of the plurality of widgets as a response to the second call, based on a determination that the second one of the plurality of widgets made the second call.

19. The non-transitory machine-readable storage medium of claim 18, wherein the orchestrating at run time of the application the first call and the second call into the third call comprises:
  integrating a plurality of request parameters of the first call into a plurality of request parameters of the third call;
  integrating a plurality of request parameters of the second call into the plurality of request parameters of the third call; and
  making the third call.

* * * * *